US012679495B2

(12) United States Patent
Sullivan

(10) Patent No.: US 12,679,495 B2
(45) Date of Patent: Jul. 14, 2026

(54) BICYCLE SUSPENSION COMPONENTS

(71) Applicant: SRAM, LLC, Chicago, IL (US)

(72) Inventor: Devon Sullivan, Woodland Park, CO (US)

(73) Assignee: SRAM, LLC, Chicago, IL (US)

( * ) Notice: Subject to any disclaimer, the term of this patent is extended or adjusted under 35 U.S.C. 154(b) by 100 days.

(21) Appl. No.: 17/146,109

(22) Filed: Jan. 11, 2021

(65) Prior Publication Data

US 2021/0214041 A1    Jul. 15, 2021

Related U.S. Application Data

(60) Provisional application No. 62/960,428, filed on Jan. 13, 2020.

(51) Int. Cl.
| | |
|---|---|
| *B62K 25/08* | (2006.01) |
| *F16F 9/06* | (2006.01) |
| *F16F 9/44* | (2006.01) |
| *F16F 9/46* | (2006.01) |
| *F16F 9/34* | (2006.01) |

(52) U.S. Cl.
CPC .............. *B62K 25/08* (2013.01); *F16F 9/062* (2013.01); *F16F 9/063* (2013.01); *F16F 9/3405* (2013.01); *F16F 9/44* (2013.01); *F16F 9/466* (2013.01); *F16F 9/469* (2013.01)

(58) Field of Classification Search
CPC ....... B62K 25/08; B62K 25/286; F16F 9/062; F16F 9/063; F16F 9/3405; F16F 9/44; F16F 9/466; F16F 9/469; F16F 2222/126; F16F 9/467; F16F 2222/12; F16F 2228/066; F16F 2230/186
See application file for complete search history.

(56) References Cited

U.S. PATENT DOCUMENTS

| | | | | |
|---|---|---|---|---|
| 5,211,420 | A | * | 5/1993 | Iwashita ................ B62K 25/08 |
| | | | | 280/5.513 |
| 5,248,014 | A | * | 9/1993 | Ashiba ...................... F16F 9/50 |
| | | | | 188/282.8 |
| 5,316,114 | A | | 5/1994 | Furuya |
| 5,588,510 | A | * | 12/1996 | Wilke ..................... F16F 9/465 |
| | | | | 188/315 |

(Continued)

FOREIGN PATENT DOCUMENTS

| | | |
|---|---|---|
| CN | 202326887 U | 7/2012 |
| TW | 200821212 | 5/2008 |
| TW | 200951015 | 12/2009 |

*Primary Examiner* — Robert A. Siconolfi
*Assistant Examiner* — James K Hsiao

(57) ABSTRACT

Example bicycle suspension components are described herein. An example damper for a bicycle suspension component includes a damper body and a damper member disposed in the damper body to control a flow of fluid between a first chamber and a second chamber in the damper body. The damper member includes a damper member body and a flow member movable relative to the damper member body along an axis of movement. The damper member body has a set of radial openings distributed circumferentially around the damper member body. The radial openings define flow paths that are transverse to the axis of movement. The flow member is movable between a first position in which the radial openings are unblocked and a second position in which the radial openings are blocked.

20 Claims, 17 Drawing Sheets

(56)                References Cited

U.S. PATENT DOCUMENTS

|  |  |  |  |  |
|---|---|---|---|---|
| 5,971,116 | A * | 10/1999 | Franklin | F16F 9/346 |
|  |  |  |  | 188/266.2 |
| 6,592,136 | B2 * | 7/2003 | Becker | F16F 9/44 |
|  |  |  |  | 188/282.1 |
| 7,273,137 | B2 * | 9/2007 | Fox | F16F 9/064 |
|  |  |  |  | 188/315 |
| 7,504,884 | B2 * | 3/2009 | Ra | H03G 3/3089 |
|  |  |  |  | 330/254 |
| 7,520,372 | B2 * | 4/2009 | Fox | F16F 9/064 |
|  |  |  |  | 188/313 |
| 8,672,106 | B2 * | 3/2014 | Laird | F16F 9/092 |
|  |  |  |  | 188/266.2 |
| 8,950,559 | B2 * | 2/2015 | de Kock | F16F 9/5126 |
|  |  |  |  | 188/322.22 |
| 9,139,065 | B2 * | 9/2015 | Yamashita | F16F 9/516 |
| 9,541,153 | B2 * | 1/2017 | Park | F16F 9/3405 |
| 9,903,436 | B2 * | 2/2018 | Barefoot | B62K 25/08 |
| 10,040,328 | B2 * | 8/2018 | Marking | F16F 9/468 |
| 10,060,499 | B2 * | 8/2018 | Ericksen | B62K 25/08 |
| 10,821,795 | B2 * | 11/2020 | Ericksen | B60G 17/018 |
| 10,933,940 | B2 * | 3/2021 | Walthert | B62K 25/08 |
| 11,040,754 | B2 * | 6/2021 | Lynch | F16F 13/007 |
| 2002/0000352 | A1 * | 1/2002 | Matsumoto | F16F 9/3484 |
|  |  |  |  | 188/282.1 |
| 2004/0222056 | A1 * | 11/2004 | Fox | F16F 9/064 |
|  |  |  |  | 188/267 |
| 2007/0096426 | A1 * | 5/2007 | McAndrews | B62K 25/286 |
|  |  |  |  | 280/284 |
| 2010/0181709 | A1 * | 7/2010 | Laird | B62K 25/06 |
|  |  |  |  | 267/218 |
| 2011/0083930 | A1 * | 4/2011 | Laird | B62K 25/08 |
|  |  |  |  | 188/314 |
| 2012/0181126 | A1 * | 7/2012 | de Kock | F16F 9/465 |
|  |  |  |  | 188/282.8 |
| 2013/0292218 | A1 * | 11/2013 | Ericksen | F16F 9/464 |
|  |  |  |  | 188/266.2 |
| 2014/0124313 | A1 * | 5/2014 | Ericksen | F16F 9/5126 |
|  |  |  |  | 188/266 |
| 2015/0081171 | A1 * | 3/2015 | Ericksen | B60G 17/018 |
|  |  |  |  | 701/37 |
| 2016/0377141 | A1 * | 12/2016 | Anderson | B62K 25/286 |
|  |  |  |  | 267/64.26 |
| 2017/0100978 | A1 * | 4/2017 | Marking | F16F 9/468 |

* cited by examiner

Toward Bottom of
Damper Body

BICYCLE SUSPENSION COMPONENTS

RELATED APPLICATION

This patent claims the benefit under 35 U.S.C. § 119 (e) of U.S. Provisional Patent Application No. 62/960,428, titled "Bicycle Suspension Components," filed Jan. 13, 2020, which is incorporated herein by this reference in its entirety. Priority to U.S. Provisional Patent Application No. 62/960,428 is claimed.

FIELD OF THE DISCLOSURE

This disclosure relates generally to bicycle components and, more specifically, to bicycle suspension components.

BACKGROUND

Bicycles are known to have suspension components. Suspension components are used for various applications, such as cushioning impacts, vibrations, or other disturbances experienced by the bicycle during use. A common application for suspension components on bicycles is for cushioning impacts or vibrations experienced by the rider when the vehicle is ridden over bumps, ruts, rocks, pot holes, and/or other obstacles. These suspension components include rear and/or front wheel suspension components. Suspension components may also be used in other locations, such as a seat post or handlebar, to insulate the rider from impacts.

SUMMARY

Disclosed herein is an example damper for a suspension component of a bicycle. The damper includes a damper body a damper member disposed in the damper body to control a flow of fluid between a first chamber and a second chamber in the damper body. The damper member includes a damper member body and a flow member movable relative to the damper member body along an axis of movement. The damper member body has a set of radial openings distributed circumferentially around the damper member body. The radial openings define flow paths that are transverse to the axis of movement. The flow member is movable between a first position in which the radial openings are unblocked and a second position in which the radial openings are blocked.

Another example damper disclosed herein includes a damper body and a damper member disposed in the damper body to control a flow of fluid between a first chamber and a second chamber in the damper body. The damper member includes a damper member body having a cavity. The damper member body also has a set of radial openings distributed circumferentially around the damper member body. The radial openings enable fluid flow between the second chamber and the cavity. The damper member also includes a flow member disposed in the cavity of the damper member body. The flow member is movable relative to the damper member body along an axis of movement. The radial openings aligned along axes that are radial relative to the axis of movement. The flow member is movable between a first position in which the radial openings are unblocked and a second position in which the radial openings are blocked.

Another example damper disclosed herein includes a damper body and a damper member disposed in the damper body to control a flow of fluid between a first chamber and a second chamber in the damper body. The damper member includes a damper member body having a set of radial openings distributed circumferentially around the damper member body and a flow member disposed outside of the damper member body. The flow member is movable relative to the damper member body along an axis of movement. The radial openings aligned along axes that are radial relative to the axis of movement. The flow member is movable between a first position in which the radial openings are unblocked and a second position in which the radial openings are blocked.

BRIEF DESCRIPTION OF THE DRAWINGS

FIG. 3A illustrates a first example compression flow path.

FIG. 4A illustrates a first example compression flow path.

FIG. 8A illustrates a first example compression flow path.

FIG. 11A illustrates a first example compression flow path.

The figures are not to scale. Instead, the thickness of the layers or regions may be enlarged in the drawings. In general, the same reference numbers will be used throughout the drawing(s) and accompanying written description to refer to the same or like parts.

Figure 1:
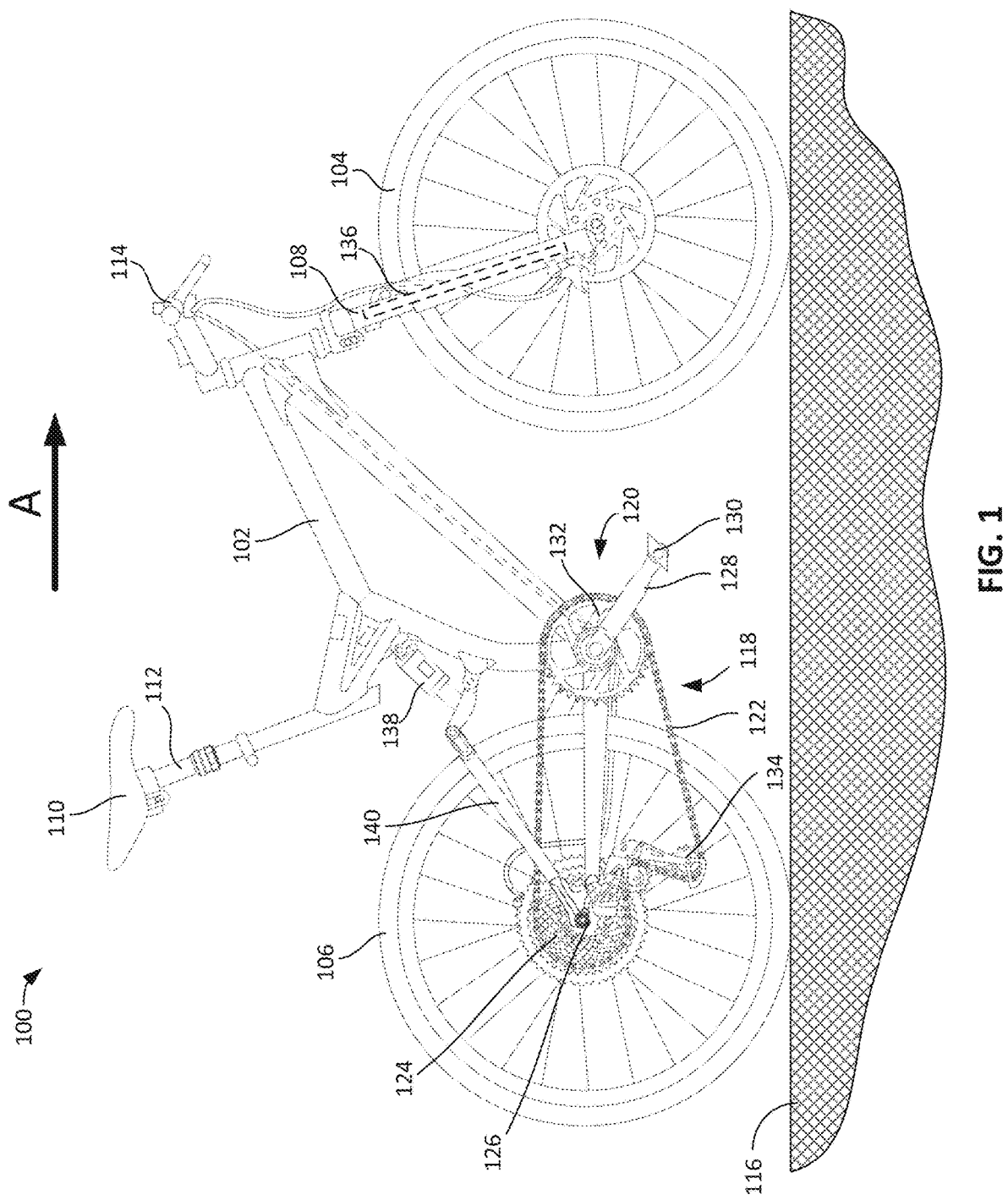
FIG. 1 is a side view of an example bicycle that may employ example suspension components disclosed herein.

Descriptors "first," "second," "third," etc. are used herein when identifying multiple elements or components that may be referred to separately. Unless otherwise specified or understood based on their context of use, such descriptors are not intended to impute any meaning of priority or ordering in time but merely as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

DETAILED DESCRIPTION

Disclosed herein are example dampers that may be implemented in a suspension component of a vehicle, such as a bicycle. The example dampers may be utilized as part of a shock absorber, which incorporates a damper and a spring that act in conjunction to absorb shock impulses. The example dampers are adjustable and can operate in different states to affect the damping rate of the suspension component. The degree of desired damping may depend on a variety of variables, such as the speed of the bicycle, the terrain over which the bicycle is being ridden, the structure of the bicycle, the wheel width, the weight of the rider, and/or the particular preferences of the rider.

Example dampers disclosed herein include example damper members that control the flow of fluid between two chambers. The example damper members disclosed herein include a hydraulic valve to control or regulate the fluid flow. The valve may be operable in multiple states or positions to affect the damping rate during compression of the suspension component. In some examples, the valves are implemented as spool or cup valves. The example valves isolate high pressure drops induced by the hydraulic fluid from the mechanical operation of the valve. This is advantageous because the actuation of the valve is independent of the pressure that is exerted on the valve. This enables a user to change a state of the valve without having to apply additional force to overcome internal pressure of the hydraulic system. This is also advantageous in remote or motor actuated systems. The valve can handle extremely high pressures without becoming stuck in the various positions.

An example valve of a damper member disclosed herein includes a flow member that is movable relative to a damper member body. In some examples, the flow member is movable along an axis of movement relative to the damper member body. In some examples, the movable flow member is disposed within the damper member body (e.g., in a cavity defined in the damper member body). In other examples disclosed herein, the movable flow member is disposed outside of the damper member body (e.g., the movable flow member is a cup that can be slid over the damper member body). The damper member body has one or more radial openings that form flow paths through which hydraulic fluid can flow. The flow paths form at least part of a flow path between the two chambers. The flow member is movable between a first (open) position in which the radial openings are unblocked or open to enable fluid flow between the chambers and a second (closed) position in which the flow member blocks or closes the radial openings to prevent fluid flow between the chambers, thereby affecting the flow rate of fluid between the two chambers during compression. In some examples, the flow member is movable to a third position between the first and second positions, which allows partial flow through the damper member. The example radial openings form flow paths that are transverse (e.g., perpendicular, radial) to the movement of the flow member relative to the body. As a result, the pressurized fluid in the chambers does not create a net load on the flow member, in static and dynamic environments. In other words, the flow member remains pressure balanced. Known damper members utilize a plug that moves linearly to block an opening that is aligned with the direction of movement of the plug. However, during static or dynamic loading, additional force is required to move the plug away from the hole. In some of the examples disclosed herein, the flow paths through the radial openings are not aligned with the movement of the flow member. Thus, significantly less force is needed to move the example flow member during static or dynamic actuation of the suspension component. This reduces the amount of user force needed to change the state of the example valve, if manually actuated, or enables the use of a smaller, lower powerful actuation mechanism, if electronically actuated.

In some examples, one or more compliant members (e.g., an o-ring) are used to provide redundant sealing when the flow member is in the second (closed) position. In particular, known spool valves often allow some leakage of fluid. However, some of the example valves disclosed herein utilize one or more compliant member to ensure a leak-proof seal between the damper member body and the flow member.

Turning now to the figures, FIG. 1 illustrates one example of a human powered vehicle on which the example suspension components disclosed herein may be implemented. In this example, the vehicle is one possible type of bicycle 100, such as a mountain bicycle. In the illustrated example, the bicycle 100 includes a frame 102 and a front wheel 104 and a rear wheel 106 rotatably coupled to the frame 102. In the illustrated example, the front wheel 104 is coupled to the front end of the frame 102 via a front fork 108. A front and/or forward riding direction or orientation of the bicycle 100 is indicated by the direction of the arrow A in FIG. 1. As such, a forward direction of movement for the bicycle 100 is indicated by the direction of arrow A.

In the illustrated example of FIG. 1, the bicycle 100 includes a seat 110 coupled to the frame 102 (e.g., near the rear end of the frame 102 relative to the forward direction A) via a seat post 112. The bicycle 100 also includes handlebars 114 coupled to the frame 102 and the front fork 108 (e.g., near a forward end of the frame 102 relative to the forward direction A) for steering the bicycle 100. The bicycle 100 is shown on a riding surface 116. The riding surface 116 may be any riding surface such as the ground (e.g., a dirt path, a sidewalk, a street, etc.), a man-made structure above the ground (e.g., a wooden ramp), and/or any other surface.

In the illustrated example, the bicycle 100 has a drivetrain 118 that includes a crank assembly 120. The crank assembly 120 is operatively coupled via a chain 122 to a sprocket assembly 124 mounted to a hub 126 of the rear wheel 106. The crank assembly 120 includes at least one, and typically two, crank arms 128 and pedals 130, along with at least one front sprocket, or chainring 132. A rear gear change device 134, such as a derailleur, is disposed at the rear wheel 106 to move the chain 122 through different sprockets of the sprocket assembly 124. Additionally or alternatively, the bicycle 100 may include a front gear change device to move the chain 122 through gears on the chainring 132.

The example bicycle 100 includes a suspension system having one or more suspension components. In the illustrated example, the bicycle 100 includes a front suspension component 136 and a rear suspension component 138. In this example, the front and rear suspension components 136, 138 are implemented as shock absorbers (sometimes referred to as shocks) and referred to herein as the front and rear shock absorbers 136, 138. The front and rear shock absorbers 136, 138 absorb shocks while riding the bicycle 100 (e.g., when riding over rough terrain). In the illustrated example, the front shock absorber 136 is integrated into the front fork 108. In the illustrated example, the rear shock absorber 138 is coupled between two portions of the frame 102, including a swing arm 140 coupled to the rear wheel 106. In other examples, the front shock absorber 136 and/or the rear shock absorber 138 may be integrated into the bicycle 100 in other configurations or arrangements. Further, in other examples, the suspension system may employ only one suspension component (e.g., only one shock absorber, such as the front shock absorber 136) or more than two suspension components (e.g., an additional suspension component on the seat post 112) in addition to or as an alternative to the front and rear shock absorbers 136, 138. Also, while in this example the front suspension component 136 and the rear suspension component 138 are implemented as shock absorbers, in other examples, the front and/or rear suspension components 136, 138 may be implemented as other types of suspension components (e.g., only a spring, only a damper, etc.).

While the example bicycle 100 depicted in FIG. 1 is a type of mountain bicycle, the example suspension components disclosed herein can be implemented on other types of bicycles. For example, the disclosed suspension components may be used on road bicycles, as well as bicycles with mechanical (e.g., cable, hydraulic, pneumatic, etc.) and non-mechanical (e.g., wired, wireless) drive systems. The disclosed suspension components may also be implemented on other types of two-, three-, and four-wheeled human powered vehicles. Further, the example suspension components can be used on other types of vehicles, such as motorized vehicles (e.g., a motorcycle, a car, a truck, etc.).

Figure 2:
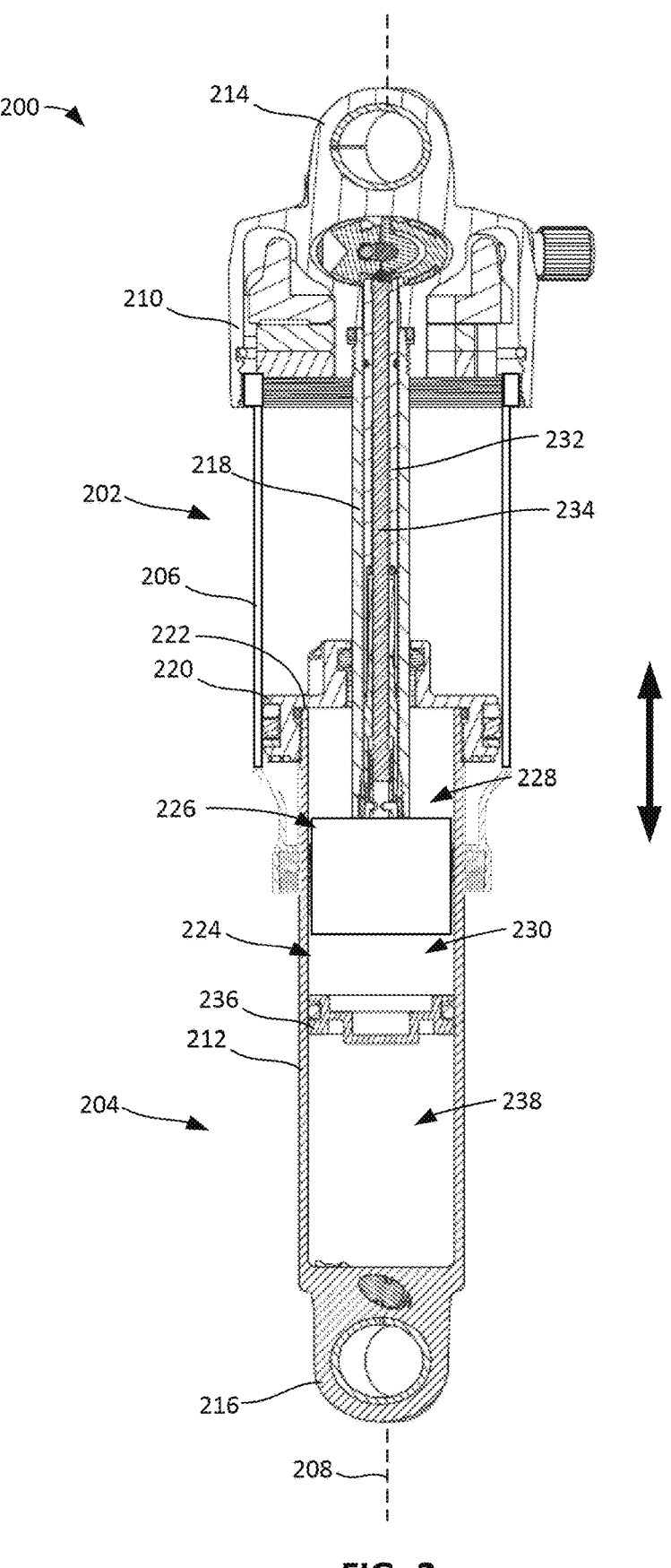
FIG. 2 is a cross-sectional view of an example shock absorber that may be used on the example bicycle of FIG. 1.

FIG. 2 is a cross-sectional view of an example shock absorber 200 (a suspension component) constructed in accordance with the teachings of this disclosure. The example shock absorber 200 can be implemented as the rear shock absorber 138 and used on the bicycle 100 of FIG. 1. For example, the shock absorber 200 can be coupled between the frame 102 and the swing arm 140 to absorb vibrations and shocks from the rear wheel 106. Example damper members are disclosed in further detail herein that can be implemented in the example shock absorber 200.

In the illustrated example, the shock absorber 200 includes an integrated spring 202 and damper 204. The spring 202 operates (by compressing or expanding) to absorb vibrations or shocks, while the damper 204 operates to dampen (slow) the movement of the spring 202. In the illustrated example, the spring 202 is implemented as an air can 206. However, in other examples, the spring 202 may be implemented as another type of spring, such as a coil spring. The spring 202 and the damper 204 are configured in a telescoping arrangement and aligned along an axis 208.

In the illustrated example, the shock absorber 200 includes a cap 210, which forms a top (or end) of the air can 206. The damper 204 includes a damper body 212. The cap 210 and the damper body 212 include respective first and second attachment portions 214, 216 (e.g., eyelets) at distal ends for connecting the shock absorber 200 between two components of a bicycle, such as two points on the frame 102 (FIG. 1) of the bicycle 100 (FIG. 1), the frame 102 and the swing arm 140 (FIG. 1) connected to the rear wheel 106 (FIG. 1) of the bicycle 100, and/or another intermediate part or component. In the illustrated example, the first and second attachment portions 214, 216 are aligned along the axis 208 of the spring 202 and the damper 204. The air can 206 and the damper body 212 are configured in a telescopic arrangement. In particular, in this example, the damper body 212 is moveable into and out of the air can 206 as shown by the double-sided arrow. For example, during compression, the first and second attachment portions 214, 216 are pushed toward each other, which moves the damper body 212 into the air can 206 (or moves the air can 206 over the damper body 212). Conversely, during rebound, the first and second attachment portions 214, 216 are pushed (or and/or pulled) apart at least in part by force from the spring 202, which moves the damper body 212 out of the air can 206.

In general, compression of the shock absorber 200 is followed by rebound. The example damper 204 of FIG. 2 includes the ability to independently adjust the compression and rebound rates. This type of control enables the rear shock absorber 138 to be configured for specific types of riding and for specific rider styles and preferences.

In the illustrated example, the damper 204 includes a stem or shaft 218 (sometimes referred to as a damper rod) that is coupled to and extends from the cap 210. A fixed piston 220 is coupled (e.g., via threaded engagement) to a top end 222 of the damper body 212. In the illustrated example, the damper body 212 defines a chamber 224. The shaft 218 extends through the fixed piston 220 and into the chamber 224. The shaft 218 slides into and out of the damper body 212 through the fixed piston 220 as the shock absorber 200 compresses and rebounds. The fixed piston 220 is slidable within the air can 206. During compression (when the air can 206 and the damper body 212 move toward each other), the fixed piston 220 is pushed into the air can 206, which compresses a gas (e.g., air) within the air can 206. After the compressive force is removed, the compressed gas in the air can 206 acts against the fixed piston 220 and pushes the fixed piston 220 (and, thus, the damper body 212) outward from the air can 206. In other examples, the air can 206 can be filled with other types of fluids (e.g., oil).

The chamber 224 in the damper body 212 is filled with fluid. The fluid may be, for example, oil, such as a mineral oil based damping fluid. In other examples, other types of damping fluids may be used (e.g., silicone or glycol type fluids). As shown in FIG. 2, the damper 204 includes a damper member 226 coupled to a distal end of the shaft 218. The damper member 226 may also be referred to as a piston or a flow control member. The damper member 226 is movable in the damper body 212. In particular, in this example, the damper member 226 is slidably received within the damper body 212. The damper member 226 divides the chamber 224 into a first chamber 228 (which may be referred to as a compensator) and a second chamber 230. The damper member 226 controls the flow of fluid across the damper member 226 between the first and second chambers 228, 230 in the damper body 212, which affects the speed at which the shock absorber 200 compresses and/or rebounds. Disclosed herein are example damper members that can be implemented as the example damper member 226 of FIG. 2. The example damper members disclosed herein utilize a unique valve design that reduces or eliminates back-drive experienced in known plug-type damper members.

As used herein, a compression stroke refers to the movement that occurs when the damper member 226 is moved (slid) downward toward the bottom end of the damper body 212 and away from the top end 222 of the damper body 212. A compression stroke can be caused by any external force that moves the ends of the shock absorber 200 (e.g., the top of the cap 210 and the bottom of the damper body 212) toward each other, thereby compressing the shock absorber 200. This may occur, for example, when a rider rides over an object that causes the rear wheel 106 (FIG. 1) to be rotated upward toward the frame 102 (FIG. 1), when a rider comes down off of a jump and lands hard on the ground, etc. This movement causes an increased pressure of the fluid in the second chamber 230 and a decreased pressure of the fluid in the first chamber 228. A compression stroke may occur at faster speeds or slower speeds. During a compression stroke, fluid flows through one or more compression flow paths and across the damper member 226 from the second chamber 230 to the first chamber 228, as disclosed in further detail herein. Conversely, a rebound stroke refers to the movement that occurs when the damper member 226 is moved (slid) in the opposite direction, i.e., away from the bottom end of the damper body 212 and toward the top end 222 of the damper body 212. The rebound movement is driven by the spring 202. For example, after the compressive force is removed, the air can 206 causes the damper body 212 to move away from the cap 210, which causes the damper member 226 to slide (upward) in the chamber 224 in FIG. 2, thereby expanding the shock absorber 200. This movement causes an increased pressure of the fluid in the first chamber 228 and a decreased pressure of the fluid in the second chamber 230. During a rebound stroke, fluid flows through one or more rebound flow paths and across the damper member 226 from the first chamber 228 to the second chamber 230. The damper member 226 is configured to control the flow of fluid through or across the damper member 226 between the first and second chambers 228, 230, thereby affecting the compression and rebound damping rates. As disclosed in further detail herein, the damper member 226 includes an arrangement of circuits or flow paths across the damper member 226 that enables controlled fluid flow between the first and second chambers 228, 230 during compression and rebound.

To independently adjust the compression and rebound rates of the damper 204, the shock absorber 200 in the illustrated example includes a rebound needle 232 (sometimes referred to a rebound rod) and a compression needle 234 (sometimes referred to as a compression rod). The rebound needle 232 and the compression needle 234 are independently movable and used to operate one or more components in the damper member 226 to affect the flow rates across the damper member 226. In the illustrated example, the rebound needle 232 and the compression needle 234 are coaxially disposed in the shaft 218. The rebound and compression needles 232, 234 may be manually operated or actuated. For example, the cap 210 may include rebound and compression adjustment dials that a user can operate to move the respective rebound and compression needles 232, 234. Additionally or alternatively, the shock absorber 200 may include one or more actuation mechanisms, such as a motor or solenoid, to move the rebound needle 232 and/or the compression needle 234. The actuation mechanism(s) may be activated in response to a signal from a remote device.

Figure 6:
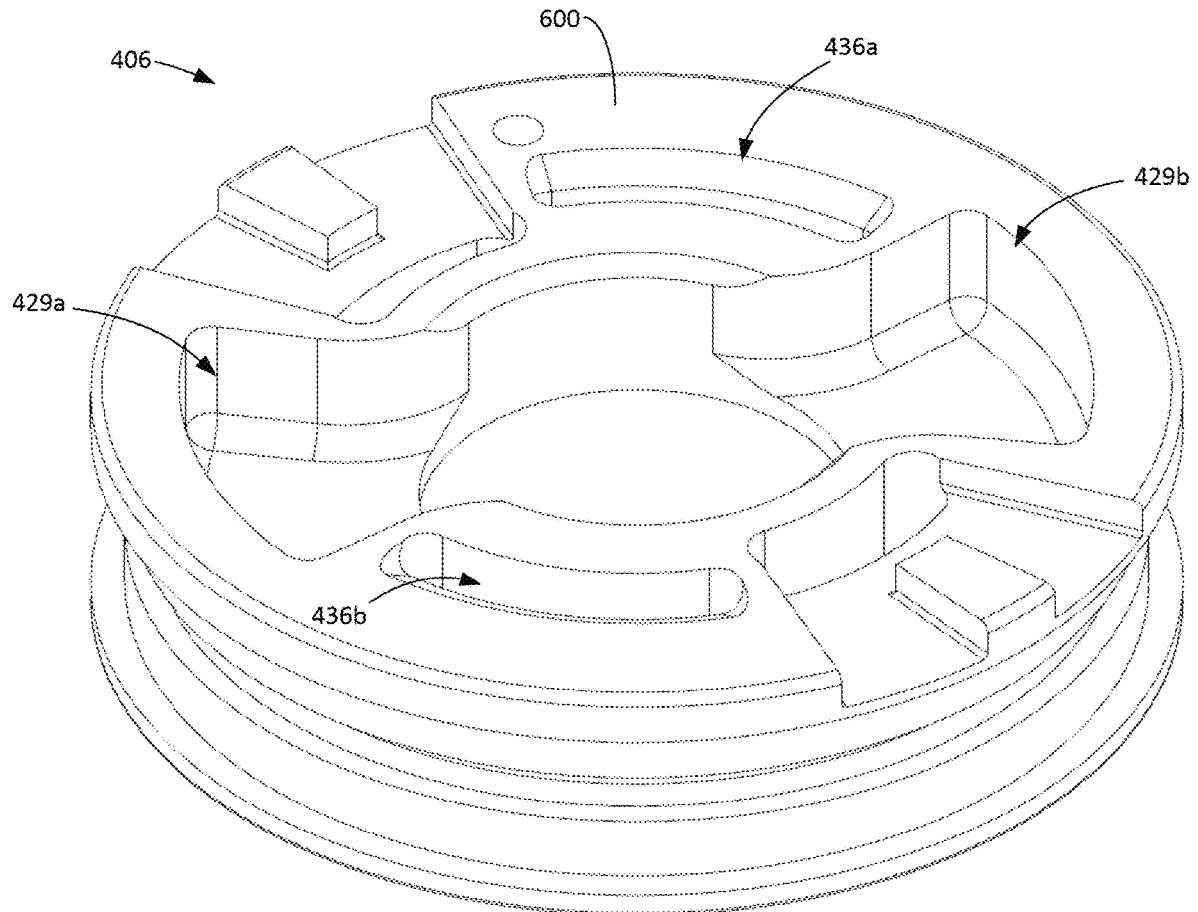
FIG. 6 is a perspective view of an example body of the example damper member of FIGS. 4A-4C.

In this example, the damper 204 includes an internal floating piston (IFP) 236 that is slidably disposed within the damper body 212. As shown in FIG. 6, the IFP 236 separates the fluid in the second chamber 230 from a pneumatic pressure chamber 238 having a pneumatic fluid, such as air or nitrogen. The IFP 236 is moveable upward or downward based on the pressure differential across the IFP 236. The IFP 236 provides pressure on the fluid (e.g., oil) in the second chamber 230 to force the fluid through the flow paths in the damper member 226 and prevent cavitation on the damper member 226. The IFP 236 also compensates for the volume that the shaft 218 consumes when inserted into the damper body 212 (e.g., during assembly). In other examples, the shock absorber 200 may not include an IFP.

Figure 3A:
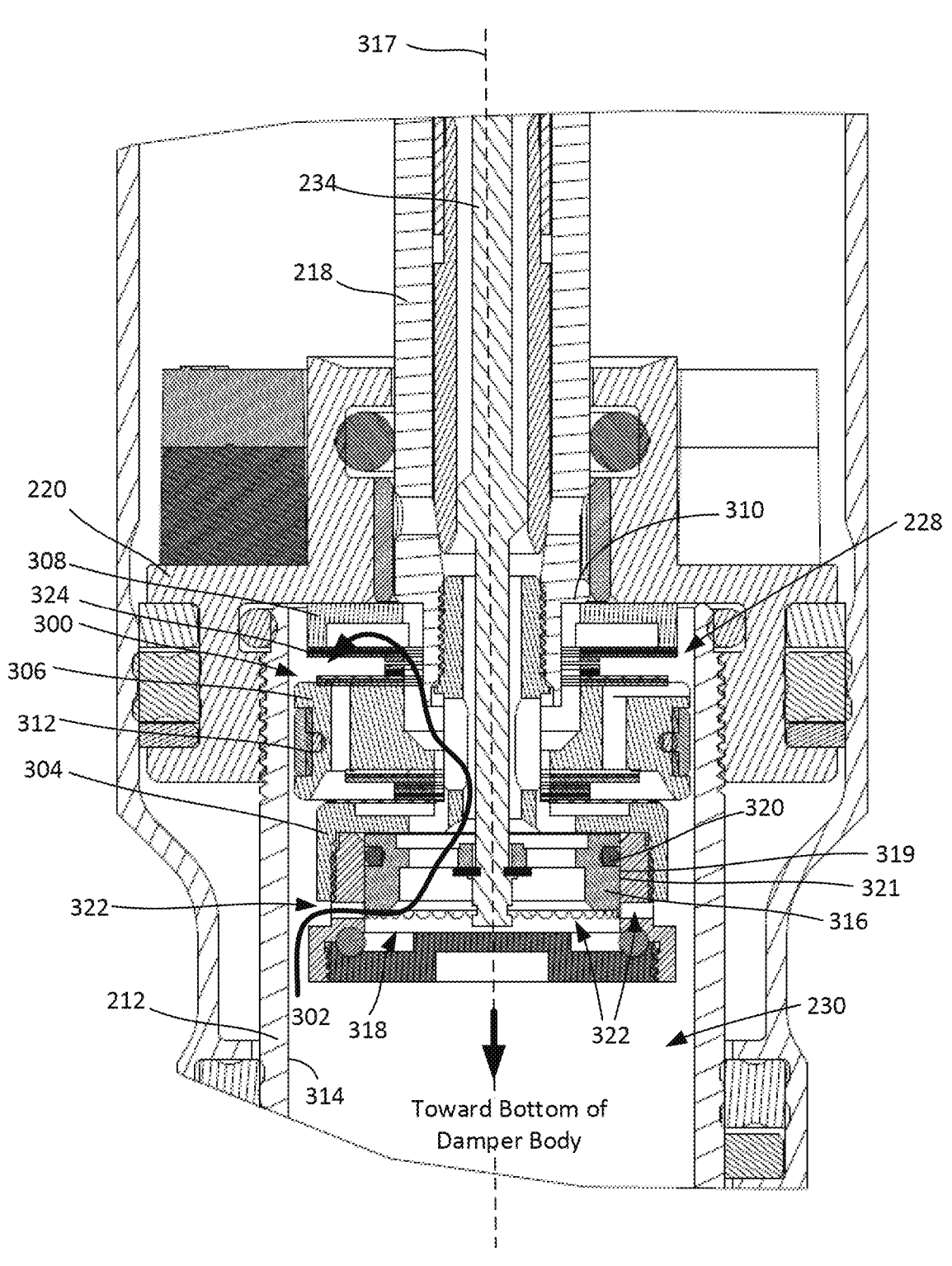
FIG. 3A is a cross-sectional view of an example damper member that be utilized in the example shock absorber of FIG. 2.

FIG. 3A is a cross-sectional view of an example damper member 300 that may be implemented as the damper member 226 in the example shock absorber 200 of FIG. 2. In this example, the damper member 300 utilizes a two-position spool valve to control the flow of fluid between the first chamber 228 and the second chamber 230 during a compression stroke. FIG. 3A illustrates a first compression flow path 302 along which fluid flows during a compression stroke when a flow member of the example damper member 300 is in an open position, as disclosed in further detail herein. The first compression flow path 302 defines a flow path across the damper member 300 from the second chamber 230 to the first chamber 228.

In the illustrated example, the example damper member 300 is coupled to the shaft 218 and disposed in the damper body 212. In FIG. 3A, the damper member 300 is at an uppermost position in which the damper member 300 is engaged with the fixed piston 220. During a compression stroke, the damper member 300 is moved toward a bottom of the damper body 212.

The damper member 300 includes one or more damper member bodies or housings that define flow channels, such as a first damper member body 304 and a second damper member body 306, referred to herein as the first body 304 and the second body 306, respectively. Each of the first and second bodies 304, 306 may be constructed of multiple components. The first body 304 is coupled to (e.g., via threaded engagement) the shaft 218. The second body 306 and a compression check plate 308 are clamped between the first body 306 and a shoulder 310 on the shaft 218. Thus, the first and second bodies 304, 306 and the compression check plate 308 are fixedly coupled and move with the shaft 218. In other examples, the damper member 300 may include more or fewer bodies and/or the bodies may be combined in other configurations.

In the illustrated example, the damper member 300 includes a seal 312 disposed around the second body 306 to create a seal between the second body 306 and an inner surface 314 of the damper body 212 that separates the first and second chambers 228, 230. While in FIG. 3A there appears to be a gap between the seal 312 and the inner surface 314, in practice, the seal 312 is sealingly engaged with the inner surface 314 to prevent fluid from leaking between the first and second chambers 228, 230.

To control the flow of fluid from the second chamber 230 to the first chamber 228 during a compression stroke, the damper member 300 includes a flow member 316. The first body 304 and the flow member 316 form a spool valve. In the illustrated example, the flow member 316 is movable relative to the first body 304 (and also the second body 306) along an axis 317, referred to herein as the axis of movement 317. In this example, the axis of movement 317 is the same as or coincident with the axis 208 (FIG. 2), the longitudinal axis of the shock absorber 200, as well the central axis of the damper member 300.

In the illustrated example, the first body 304 has a cavity 318 formed in the first body 304. In this example, the flow member 316 is disposed in the cavity 318. The flow member 316 is movable (e.g., slidable) up and down in the orientation of FIG. 3A along an inner surface 319 of the first body 304 defining the cavity 318 between the first (open) and second (closed) positions. In some examples, an outer surface 321 of the flow member 316 is slidably engaged (e.g., in contact) with the inner surface 319 of the first body 304 defining the cavity 318. In other examples, a small gap may exist between the inner surface 319 and the outer surface 321. The flow member 316 is coupled to the compression needle 234 (e.g., via a retainer ring, via a threaded fastener, etc.). The compression needle 234 can be moved up and down in FIG. 3A to move the flow member 316 up and down in the cavity 318 relative to the first body 304. In this example, the flow member 316 is a sleeve or ring-shaped body. A first seal 320 (e.g., an o-ring) is disposed around the flow member 316 to create a seal between the flow member 316 and the inner surface 319 of the first body 304 defining the cavity 318.

In the illustrated example, the first body 304 has a set of radial openings 322 (three of which are referenced in FIG. 3A) spaced around the first body 304. In this example, the radial openings 322 are distributed circumferentially around the first body 304. The radial openings 322 enable fluid flow between the second chamber 230 and the cavity 318. Any number of radial openings may be provided (e.g., one, two, three, etc.). In some examples, the radial openings 322 are spaced equidistant from one another. The radial openings 322 are aligned along axes that are transverse (e.g., perpendicular) to the axis of movement 317 along which the flow member 316 moves (e.g., up and down in FIG. 3A). Therefore, the radial openings 322 define flow paths that are transverse to the axis of movement 317. In some examples, the radial openings 322 are aligned along axes that are radial (perpendicular) to the axis of movement 317. In the illustrated example, the radial openings 322 are circular shaped. In other examples, the radial openings 322 can be shaped differently (e.g., square, triangular, polygonal, etc.).

Figure 3B:
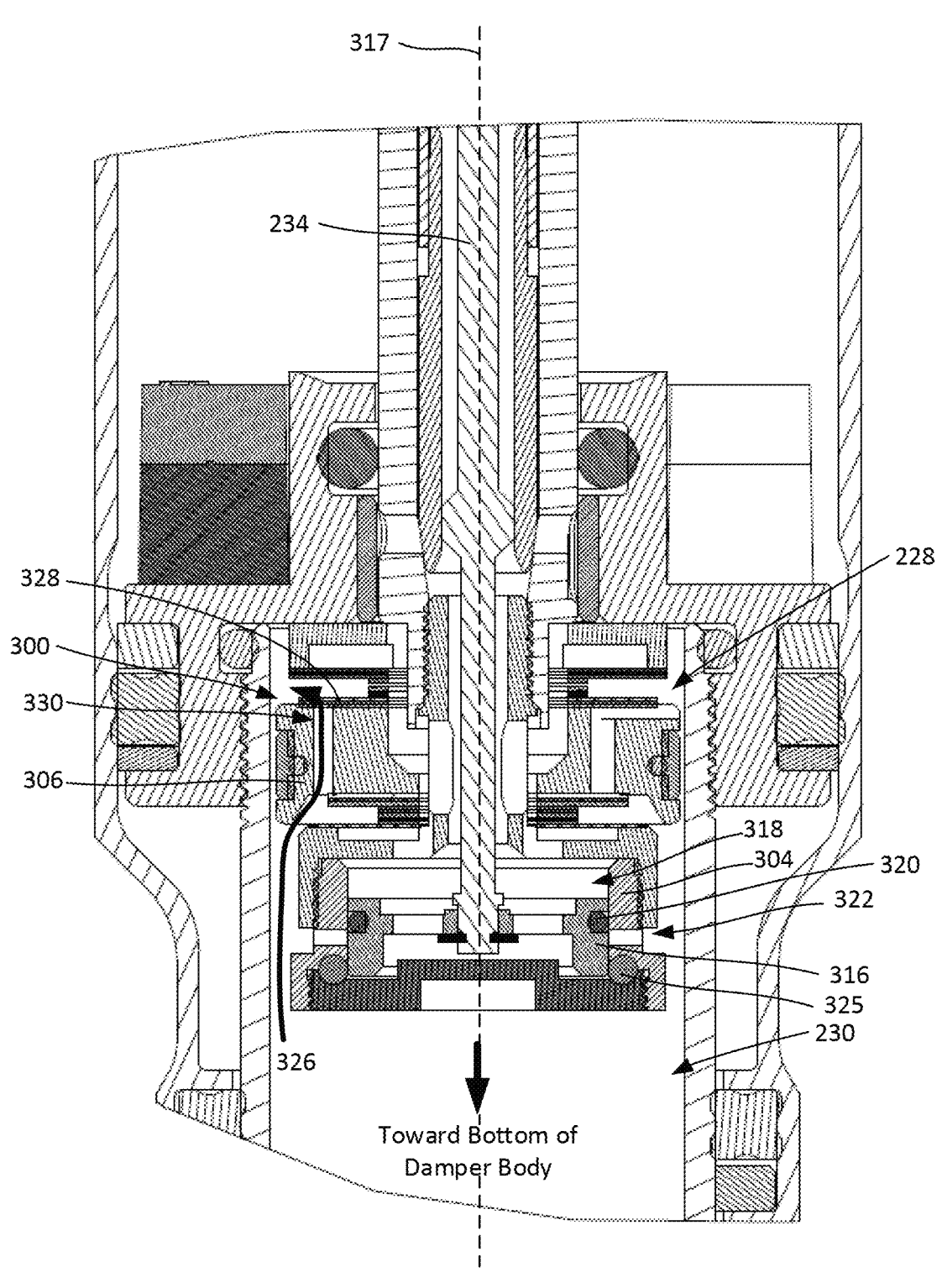
FIG. 3B illustrates the example damper member of FIG. 3A showing a second example compression flow path.

In this example, the flow member 316 is movable up and down in the cavity 318 between a first position, referred to herein as an open position (which is the position shown in FIG. 3A), and a second position, referred to herein as a closed position (which is shown in FIG. 3B). When the flow member 316 is in the open position shown in FIG. 3A, the flow member 316 does not block the radial openings 322. As such, during a compression stroke, fluid flows along the first compression flow path 302. In particular, during a compression stroke, fluid from the second chamber 230 flows through the radial openings 322 and into the cavity 318, through the flow member 316, through channels in the first and second bodies 304, 306, and into the compression check plate 308. The fluid bends a compression shim stack 324 open (away from the compression check plate 308), thereby enabling the fluid to flow into the first chamber 228. Therefore, when the flow member 316 is in the first position (the open position), the flow paths through the radial openings 322 form a portion of the first compression flow path 302 between the first and second chambers 228, 230. This flow of fluid through the first and second bodies 304, 306 and across the compression shim stack 324 dampens or slows the movement of the fluid, thereby dampening movement of the shock absorber 200 (FIG. 2) during compression.

FIG. 3B shows the flow member 316 after being moved downward along the axis of movement 317 to the closed position. This position may also be referred to as a lockout position. In particular, in some examples, the damper member 300 is operable in a lockout mode that provides relatively high damping to substantially limit movement (e.g., compression) of the shock absorber 200.

The flow member 316 is moved to the closed position by moving the compression needle 234 (e.g., manually or via a motor) downward in FIG. 3B, which moves the flow member 316 downward in the cavity 318 in FIG. 3B. In the closed position, the flow member 316 blocks or closes the radial openings 322 (one of which is referenced in FIG. 3B) in the first body 304. As such, during compression, fluid cannot flow along the first compression flow path 302 (FIG. 3A).

This substantially locks or prevents the shock absorber 200 (FIG. 2) from compressing. In the locked position, the flow member 316 engages a second seal 325 (e.g., an o-ring). The first and second seals 320, 325 prevent leakage of fluid between the first body 304 and the flow member 316.

However, in some examples, even in the lockout mode, the damper member 300 may still allow some movement under relatively high forces, such as where a rider comes down off of a jump and lands hard on the ground. This enables a blow off of some of the pressure in the second chamber 230. FIG. 3B illustrates a second compression flow path 326, which may be referred to as a lockout flow path. In the illustrated example, the damper member 300 includes a lockout shim 328 that covers a passageway 330 formed in the second body 306. If the pressure of the fluid in the second chamber 230 reaches a threshold pressure, the fluid forces the lockout shim 328 to bend open. The fluid flows across the second body 306 from the second chamber 230 to the first chamber 228 along the second compression flow path 326. Therefore, the flow member 316 is movable between a first position (the open position shown in FIG. 3A) in which the radial openings 322 are unblocked and a second position (the closed position shown in FIG. 3B) in which the radial openings 322 are blocked (via the flow member 316).

To move the flow member 316 back to the open position (FIG. 3A), the compression needle 234 may be moved upward in FIGS. 3A and 3B to move the flow member 316 upward in the cavity 318, which unblocks the radial openings 322. Because the radial openings 322 define flow paths that are transverse to the movement of the flow member 316 (e.g., transverse to the axis of movement 317), the pressure differential between the second chamber 230 and the cavity 318 does not create a load on the flow member 316. While the pressure differential may create a hoop stress on the flow member 316, the pressure differential does not create a load against the movement of the flow member 316. The flow member 316 buffers the first and second seals 320, 325 so that the valve can switch between the two states with no back-drive or output force to the external adjusters. As such, only a relatively small force is needed to move the flow member 316 between the opened and closed positions. This enables the use of a smaller, less powerful motor to move the flow member 316.

Figure 4A:
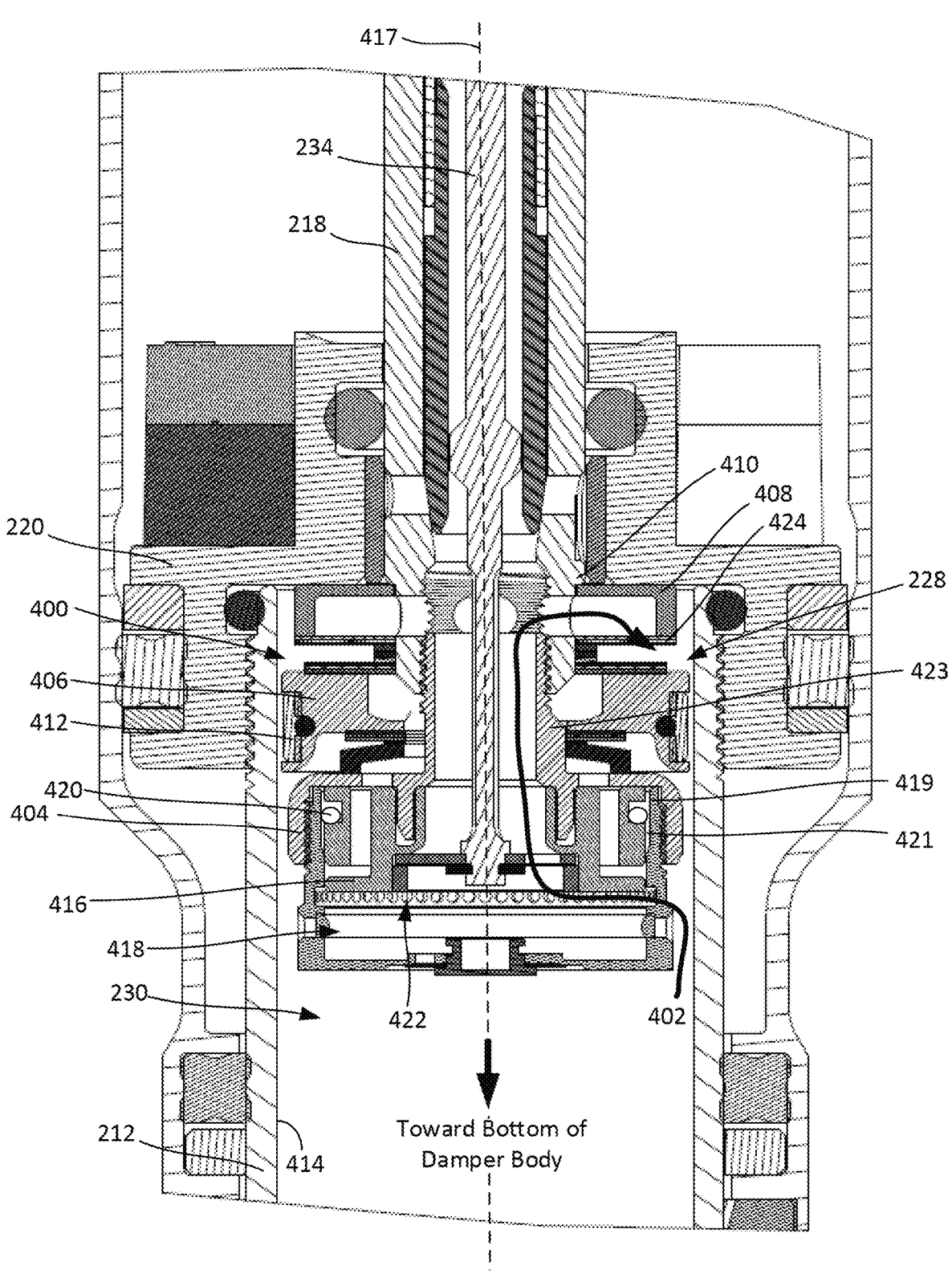
FIG. 4A is a cross-sectional view of another example damper member that may be utilized in the example shock absorber of FIG. 2.

FIG. 4A is a cross-sectional view of another example damper member 400 that may be implemented as the damper member 226 in the example shock absorber 200 of FIG. 2. In this example, the damper member 400 utilizes a three-position spool valve to control the flow of fluid between the first chamber 228 and the second chamber 230 during a compression stroke. FIG. 4A illustrates a first compression flow path 402 along which fluid flows during a compression stroke when a flow member of the example damper member 400 is in an open position, as disclosed in further detail herein. The first compression flow path 402 defines a flow path across the damper member 400 from the second chamber 230 to the first chamber 228.

In the illustrated example, the example damper member 400 is coupled to the shaft 218 and disposed in the damper body 212. In FIG. 4A, the damper member 400 is at an uppermost position in which the damper member 400 is engaged with the fixed piston 220. During a compression stroke, the damper member 400 is moved toward a bottom of the damper body 212.

The damper member 400 includes one or more damper member bodies or housings that define flow channels, such as a first damper member body 404 and a second damper member body 406, referred to herein as the first body 404 and the second body 406, respectively. Each of the first and second bodies 404, 406 may be constructed of multiple components. The first body 404 is coupled to (e.g., via threaded engagement) the shaft 218. The second body 406 and a compression check plate 408 are clamped between the first body 404 and a shoulder 410 on the shaft 218. Thus, the first and second bodies 404, 406 and the compression check plate 408 are fixedly coupled and move with the shaft 218. In other examples, the damper member 400 may include more or fewer bodies and/or the bodies may be combined in other configurations.

In the illustrated example, the damper member 400 includes a seal 412 disposed around the second body 406 to create a seal between the second body 406 and an inner surface 414 of the damper body 212 that separates the first and second chambers 228, 230. While in FIG. 4A there appears to be a gap between the seal 412 and the inner surface 414, in practice, the seal 412 is sealingly engaged with the inner surface 414 to prevent fluid from leaking between the first and second chambers 228, 230.

To control the flow of fluid from the second chamber 230 to the first chamber 228 during a compression stroke, the damper member 400 includes a flow member 416. The first body 404 and the flow member 416 form a spool valve. In the illustrated example, the flow member 416 is movable relative to the first body 404 (and also the second body 406) along an axis 417, referred to herein as the axis of movement 417. In this example, the axis of movement 417 is the same as or coincident with the axis 208 (FIG. 2), the longitudinal axis of the shock absorber 200, as well the central axis of the damper member 400.

In the illustrated example, the first body 404 has a cavity 418 formed in the first body 404. In this example, the flow member 416 is disposed in the cavity 418 formed in the first body 404. The flow member 416 is movable (e.g., slidable) up and down in the orientation of FIG. 4A along an inner surface 419 of the first body 404 defining the cavity 418 between the first (open) and second (closed) positions. In some examples, an outer surface 421 of the flow member 416 is slidably engaged (e.g., in contact) with the inner surface 419 of the first body 304 defining the cavity 418. In other examples, a small gap may exist between the inner surface 419 and the outer surface 421. The flow member 416 is coupled to the compression needle 234 (e.g., via a retainer ring, via a threaded fastener, etc.). The compression needle 234 can be moved up and down in FIG. 4A to move the flow member 416 up and down in the cavity 418 relative to the first body 404. A first seal 420 (e.g., an o-ring) is disposed around the flow member 416 to create a seal between the flow member 416 and the inner surface 419 of the first body 404 defining the cavity 418.

In the illustrated example, the first body 404 has a set of radial openings 422 (one of which is referenced in FIG. 4A) spaced around the first body 404. In this example, the radial openings 422 are distributed circumferentially around the first body 304. The radial openings 422 enable fluid flow between the second chamber 230 and the cavity 418. Any number of radial openings may be provided (e.g., one, two, three, etc.). In some examples, the radial openings 422 are spaced equidistant from one another. The radial openings 422 are aligned along axes that are transverse (e.g., perpendicular) to the axis of movement 417 along which the flow member 416 moves (e.g., up and down in FIG. 4A). Therefore, the radial openings 422 define flow paths that are transverse to the axis of movement 417. In some examples, the radial openings 422 are aligned along axes that are radial (perpendicular) to the axis of movement 417. In the illustrated example, the radial openings 422 are circular shaped. In other examples, the radial openings 422 can be shaped differently (e.g., square, triangular, polygonal, etc.).

Figure 4B:
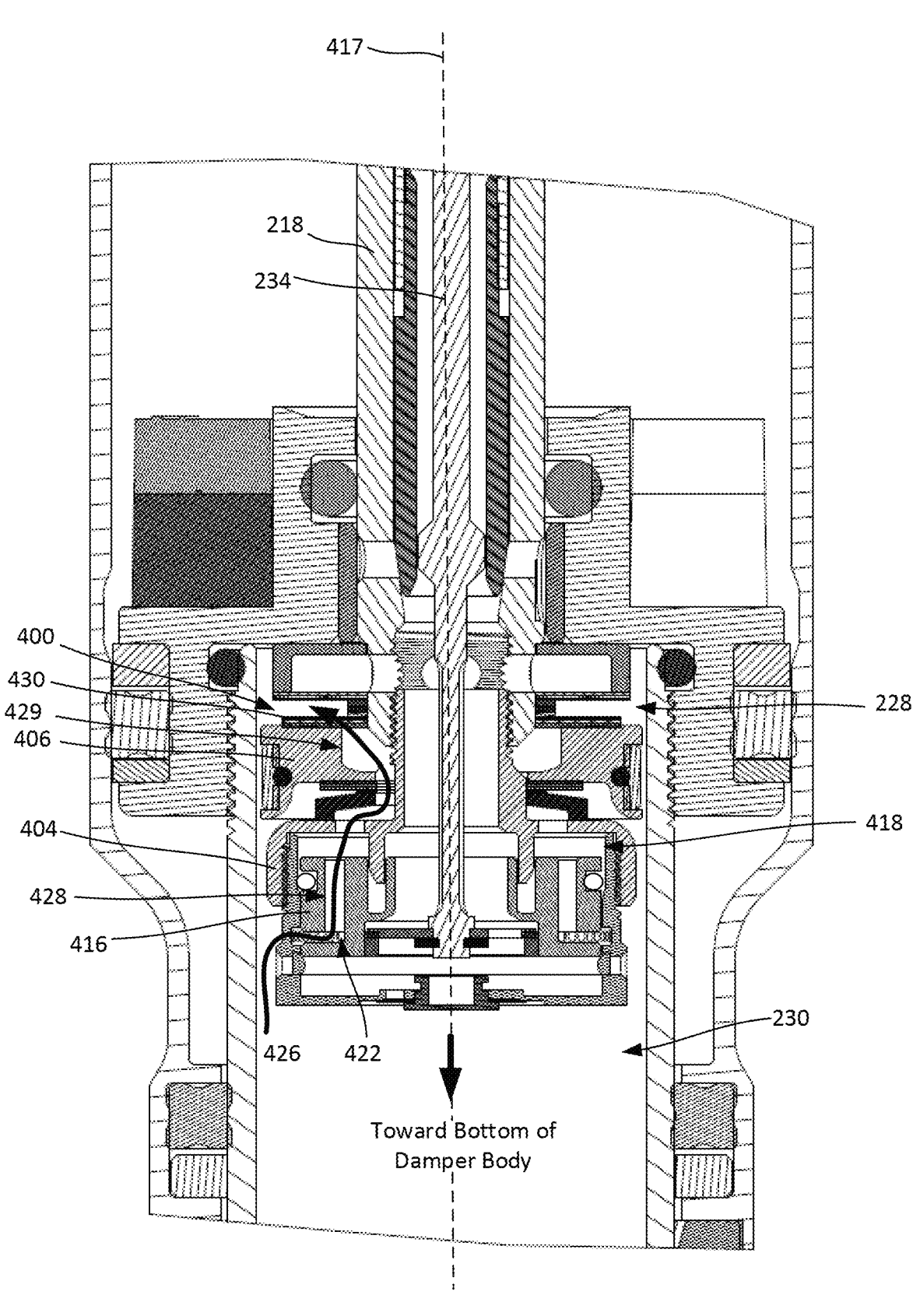
FIG. 4B illustrates the example damper member of FIG. 4A showing a second example compression flow path.
Figure 4C:
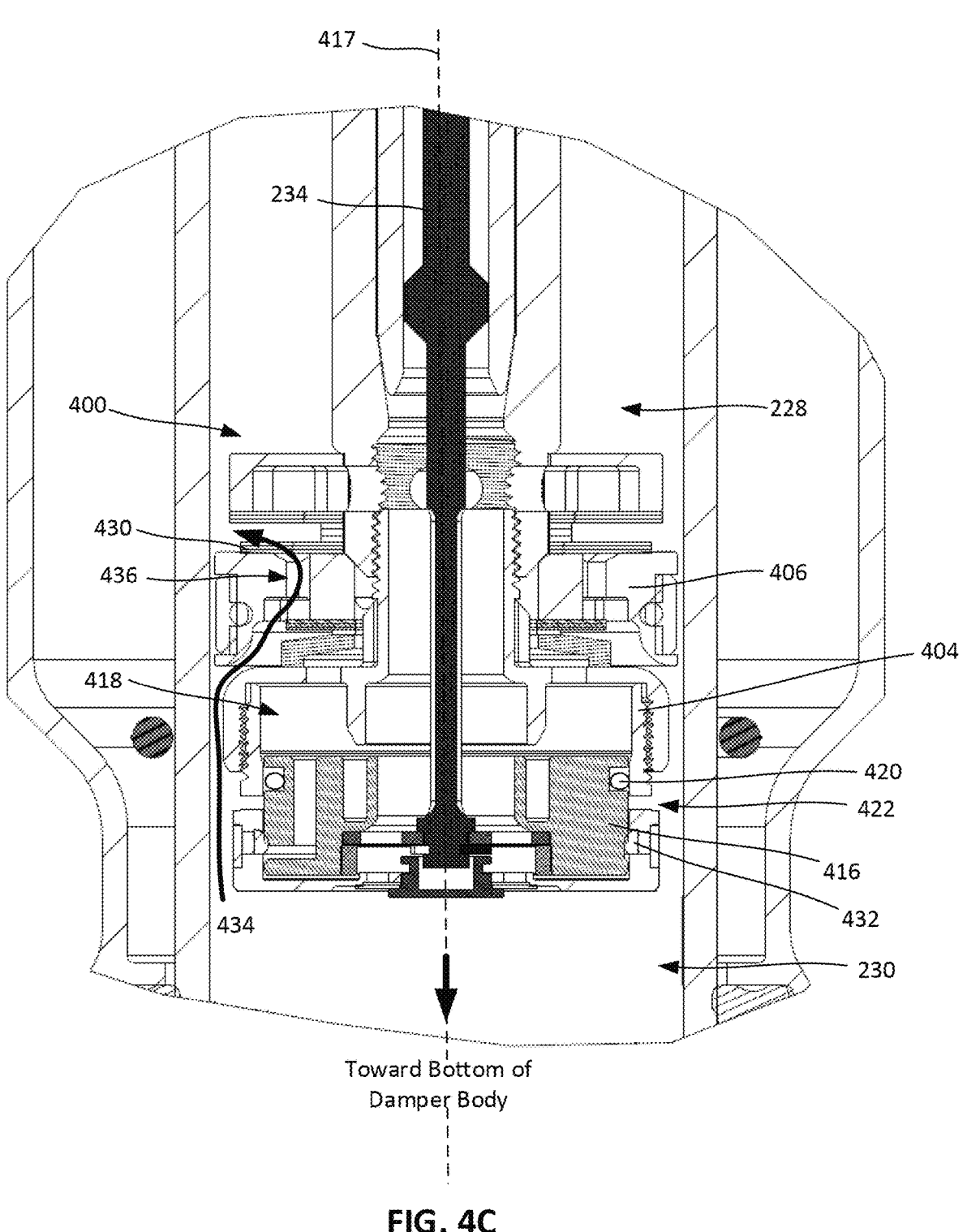
FIG. 4C illustrates the example damper member of FIGS. 4A and 4B showing a third example compression flow path.

In this example, the flow member 416 is movable up and down in the cavity 418 between a first position, referred to herein as an open position (which is the position shown in FIG. 4A), a second position, referred to herein as a partially open position (which is shown in FIG. 4B), and a third position, referred to herein as a closed position (which is shown in FIG. 4C). In the open position shown in FIG. 4A, the flow member 416 does not block the radial openings 422. As such, during a compression stroke, fluid flows along the first compression flow path 402. In particular, during a compression stroke, fluid from the second chamber 230 flows through the radial openings 422 and into the cavity 418, through the flow member 416, through a stem portion 423 of the first body 404, through openings in the shaft 218, and into the compression check plate 408. The fluid bends a compression shim stack 424 open (away from the compression check plate 408), thereby enabling the fluid to flow into the first chamber 228. Therefore, when the flow member 416 is in the first position (the open position), the flow paths through the radial openings 422 form a portion of the first compression flow path 402 between the first and second chambers 228, 230. This flow of fluid through the first body 404 and the shaft 218 and across the compression shim stack 424 dampens or slows the movement of the fluid, thereby dampening movement of the shock absorber 200 (FIG. 2) during compression.

FIG. 4B shows the flow member 416 after being moved downward along the axis of movement 417 to the partially open position. The flow member 416 is moved to the partially open position by moving the compression needle 234 (e.g., manually or via a motor) downward in FIG. 4B, which moves the flow member 416 downward in the cavity 418 in FIG. 4B. The partially open position is between the open position (FIG. 4A) and the closed position (FIG. 4C). FIG. 4B illustrates a second compression flow path 426 along which fluid flows during a compression stroke when the flow member 416 is in the partially open position.

In the illustrated example, the flow member 416 has a passageway 428. When the flow member 416 is in the partially open position, the passageway 428 is aligned with the radial openings 422 (one of which is referenced in FIG. 4B). In some examples, multiple passageways similar to the passageway 428 may be formed in the flow member 416. During a compression stroke, fluid from the second chamber 230 flows through the radial openings 422, through the passageway 428 in the flow member 416, through the first body 404, and into a first channel 429 in the second body 406. The fluid bends a compression shim stack 430 open (away from a top of the second body 406), thereby enabling the fluid to flow into the first chamber 228. Therefore, when the flow member 416 is in the second position (the partially open position), the flow paths through the radial openings 422 form a portion of the second compression flow path 426 between the first and second chambers 228, 230. This flow of fluid through the first and second bodies 404, 406, the flow member 416, and across the compression shim stack 430 dampens or slows the movement of the fluid, thereby dampening movement of the shock absorber 200 (FIG. 2) during compression. Therefore, when the flow member 416 is in the open position, the first compression flow path 402 is formed through the damper member 400 between the first and second chambers 228, 230, and when the flow member 416 is in the partially open position, the second compression flow path 426 is formed through the damper member 400 between the first and second chambers 228, 230. The second compression flow path 426 creates higher resistance than the first compression flow path 402 (FIG. 2). This reduces the compression rate of the shock absorber 200, which may be desirable based on rider style and terrain.

In this example, instead of integrating the compression shim stack 430 into the flow member 416, the compression shim stack 430 is coupled to the second body 406, which is fixedly coupled to the shaft 218. This is advantageous because the pressure drop across the compression shim stack 430 does not back-drive the flow member 416, as would occur if the compression shim stack 430 was integrated into the flow member 416. However, in other examples, the compression shim stack 430 may be coupled to and/or disposed in other location of the damper member 400.

FIG. 4C shows the flow member 416 after being moved downward along the axis of movement 417 to the closed position. This position may also be referred to as a lockout position. Similar to the damper member 300 of FIGS. 3A and 3B, the damper member 400 is operable in a lockout mode that provides relatively high damping to substantially limit movement of the shock absorber 200. The cross-section in FIG. 4C is taken along a different plane than in FIGS. 4A and 4B to expose a different flow path through the second body 406.

The flow member 416 is moved to the closed position by moving the compression needle 234 (e.g., manually or via a motor) downward in FIG. 4C, which moves the flow member 416 downward in the cavity 418 in FIG. 4C. In the closed position, the flow member 416 blocks or closes the radial openings 422 (one of which is referenced in FIG. 4C) in the first body 404. As such, during compression, fluid cannot flow along the first compression flow path 402 (FIG. 4A) or the second compression flow path 426 (FIG. 4B). This substantially locks or prevents the shock absorber 200 (FIG. 2) from compressing. In the locked position, the flow member 416 engages a second seal 432 (e.g., an o-ring). The first and second seals 420, 432 prevent leakage of fluid between the first body 404 and the flow member 416.

FIG. 4C illustrates a third compression flow path 434, which may be referred to as a lockout flow path. In the illustrated example, the second body 406 has a second channel 436, which is separate from the first channel 429 (FIG. 4B). The compression shim stack 430 covers the second channel 436 on the top side of the second body 406. If the pressure of the fluid in the second chamber 230 reaches a threshold pressure, the fluid forces the compression shim stack 430 to bend open. The fluid flows across the second body 406 from the second chamber 230 to the first chamber 228 along the third compression flow path 434. Therefore, both the second compression flow path 426 (FIG. 4B) and the third compression flow path 434 (FIG. 4C) are regulated by the compression shim stack 430. However, the second channel 436 for the third compression flow path 434 is smaller than the first channel 429 for the second compression flow path 426, which creates higher resistance that must be overcome by the pressure of the fluid. Therefore, the flow member 316 is movable between a first position (the open position shown in FIG. 4B) in which the radial openings 422 are unblocked, a second position (the partially open position shown in FIG. 4B) in which the radial openings 422 are aligned with the passageways 428, and a third position (the closed position shown in FIG. 4C) in which the radial openings 422 are blocked (via the flow member 416).

To move the flow member 416 back to the open position (FIG. 4A) or the partially open position (FIG. 4B), the compression needle 234 may be moved upward to move the flow member 416 upward in the cavity 418. Because the radial openings 422 define flow paths that are transverse to the movement of the flow member 416 (e.g., transverse to the axis of movement 417), the pressure differential between the second chamber 230 and the cavity 418 does not create a load on the flow member 416. While the pressure differential may create a hoop stress on the flow member 416, the pressure differential does not create a load against the movement of the flow member 416. As such, only a relatively small force is needed to move the flow member 416 between different positions. This enables the use of a smaller, less powerful motor to move the flow member 416.

Figure 5:
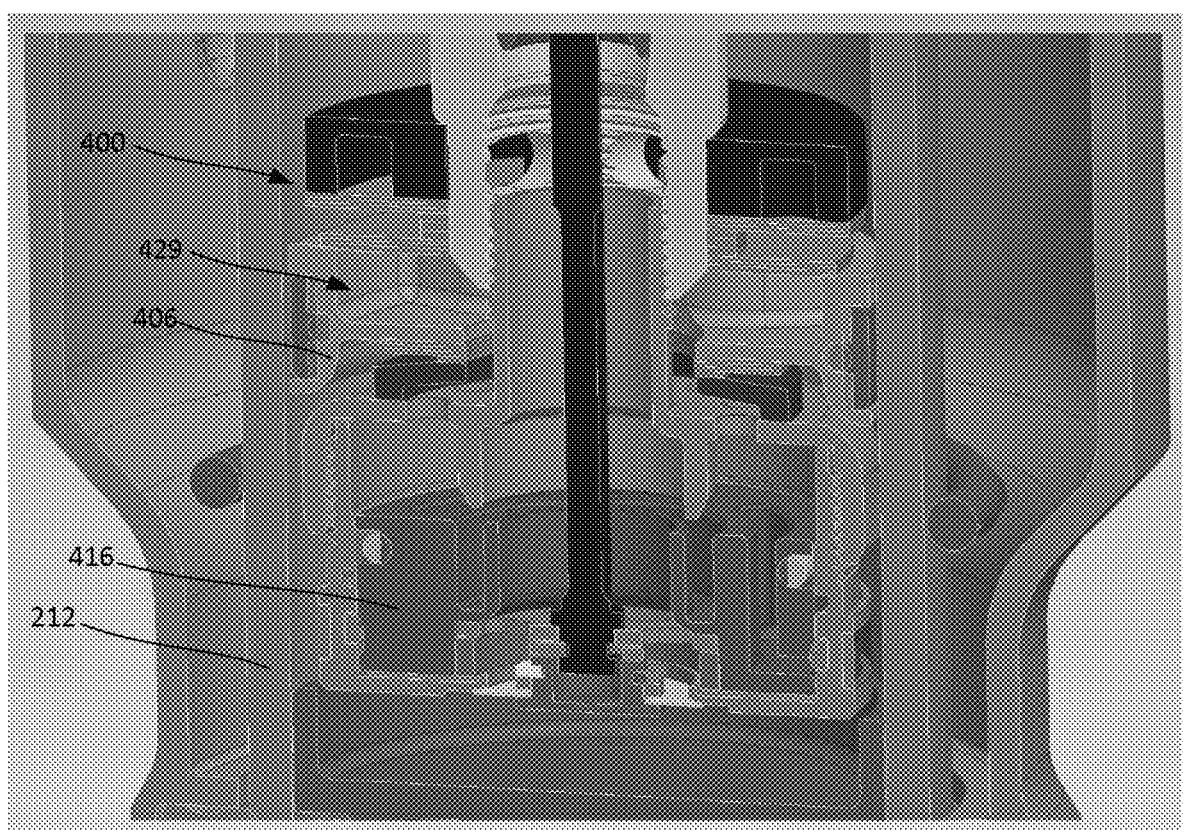
FIG. 5 is a perspective cross-sectioned view of the example damper member of FIGS. 4A-4C.

FIG. 5 is a perspective cross-sectioned view of the example damper member 400 in the damper body 212. In FIG. 5, the cross-section is taken along the first channel 429 in the second body 406, which defines a portion of the second compression flow path 426 (FIG. 4B). In the illustrated example, the flow member 416 is in the closed (lockout) position.

FIG. 6 is a perspective view of the second body 406. The compression shim stack 430 (FIGS. 4B and 4C) is to be disposed on a top side 600 of the second body 406. In this example, the first channel 429 is formed by two first channels labeled 429a, 429b. Similarly, the second channel 436 is formed by two second channels labeled 436a, 436b. The first channels 429a, 429b cover a larger area on the top side 600 than the second channels 436a, 436b. As a result, the compression shim stack 430 provides greater resistance to fluid in the second channels 436a, 436b (along the third compression flow path 434) than the first channels 429a, 429b (along the second compression flow path 426).

Figure 7:
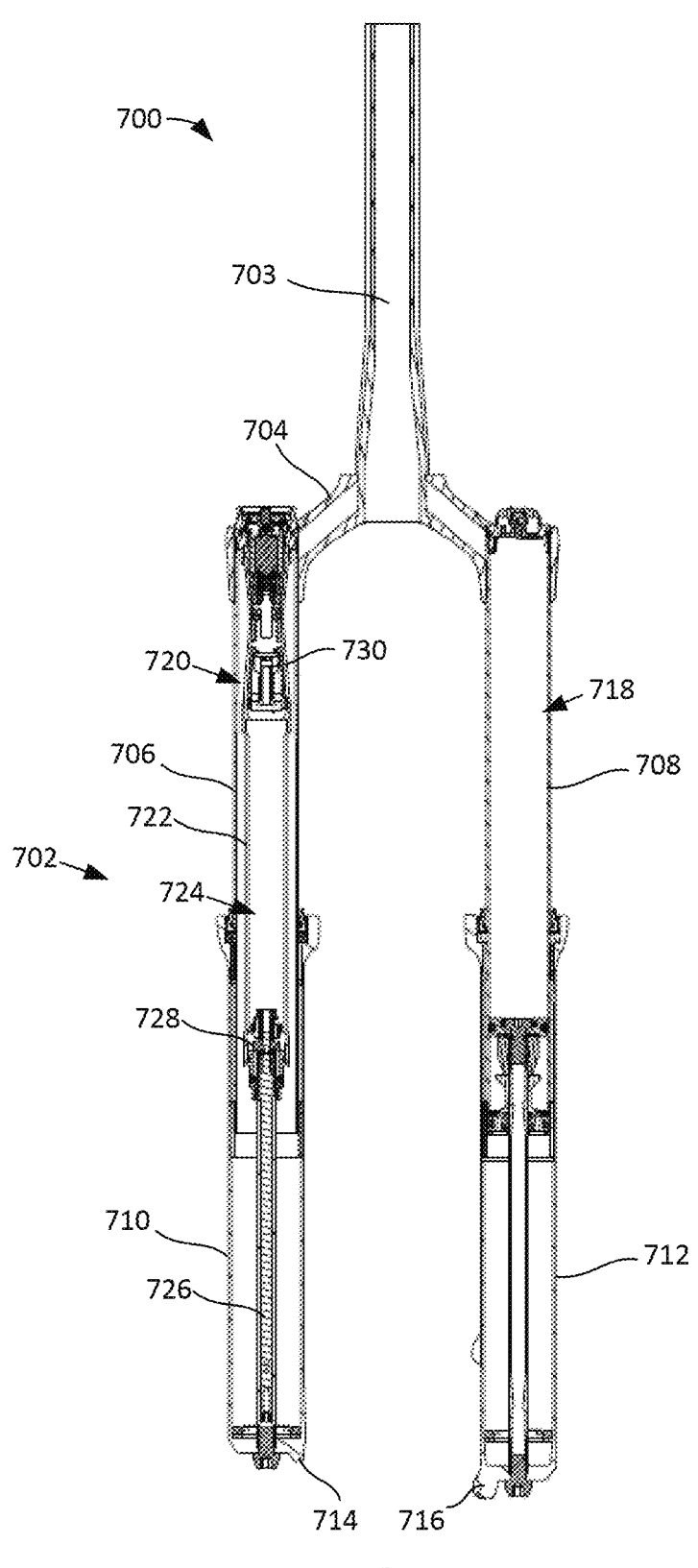
FIG. 7 is a cross-sectional view of an example fork that may be used on the example bicycle of FIG. 1.

Example damper members disclosed herein can also be implemented in a fork of a bicycle. FIG. 7 is a cross-sectional view of an example fork 700 having an integrated shock absorber 702 (a suspension component) constructed in accordance with the teachings of this disclosure. The example fork 700 and shock absorber 702 can be implemented as the front fork 108 and integrated front shock absorber 136 used on the bicycle 100 of FIG. 1. Example damper members are disclosed in further detail herein that can be implemented in the example shock absorber 702.

As shown in FIG. 7, the fork 700 includes a steering tube 703, a crown 704, first and second upper legs 706, 708 (also referred to as inner legs, tubes, or stanchions), and first and second lower legs 710, 712 (also referred to as sliders or tubes). The steering tube 703 couples to the frame 102 (FIG. 1) and the handlebars 114 (FIG. 1). In the illustrated example, the first and second upper legs 706, 708 are slidably received within the respective first and second lower legs 710, 712. Thus, the first and second upper legs 706, 708 form a telescopic arrangement with the respective first and second lower legs 710, 712. The first and second lower legs 710, 712 include respective front wheel attachment portions 714, 716, such as holes (e.g., eyelets) or dropouts, for attaching the front wheel 104 (FIG. 1) to the fork 700. During a compression stroke, the first and second upper legs 706, 708 move into or toward the respective first and second lower legs 710, 712, and during a rebound stroke, the first and second upper legs 706, 708 move out of or away from the respective first and second lower legs 710, 712.

In the illustrated example, the shock absorber 702 includes both a spring 718 and a damper 720. In this example, the spring 718 is disposed in and/or otherwise integrated into the second upper and/or lower legs 708, 712, and the damper 720 is disposed in and/or otherwise integrated into the first upper and/or lower legs 706, 710. The spring 718 may be implemented by an air spring or a physical spring (e.g., a coil spring), for example. The spring 718 is configured to resist compression and return the legs 706-712 to the extended position after compression occurs. The damper 720 is configured to limit the speed at which the compression/extension occurs and/or otherwise absorb vibrations. In the illustrated example, the damper 720 includes a damper body 722 defining a first chamber 724. The first chamber 724 may be filled with fluid. The fluid may be, for example, oil, such as a mineral oil based damping fluid. In other examples, other types of damping fluids may be used (e.g., silicon or glycol type fluids). In the illustrated example, the damper 720 includes a stem or shaft 726 (sometimes referred to as a damper rod) coupled to and extending upward from a bottom of the first lower leg 710. The damper 720 also includes a piston 728 coupled to an end of the shaft 726 and disposed in the first chamber 724. As the fork 700 compresses or rebounds, the piston 728 moves up or down i2n the first chamber 724, which increases or decreases the volume of the first chamber 724. The damper 720 includes a damper member 730 that controls the flow of fluid between the first chamber 724 and a second chamber, thereby affecting the damping rate. Disclosed herein are example damper members that can be implemented as the example damper member 730 of FIG. 7. The example damper members disclosed herein utilize a unique valve design that reduces or eliminates back-drive experienced in known plug-type damper members.

Figure 8A:
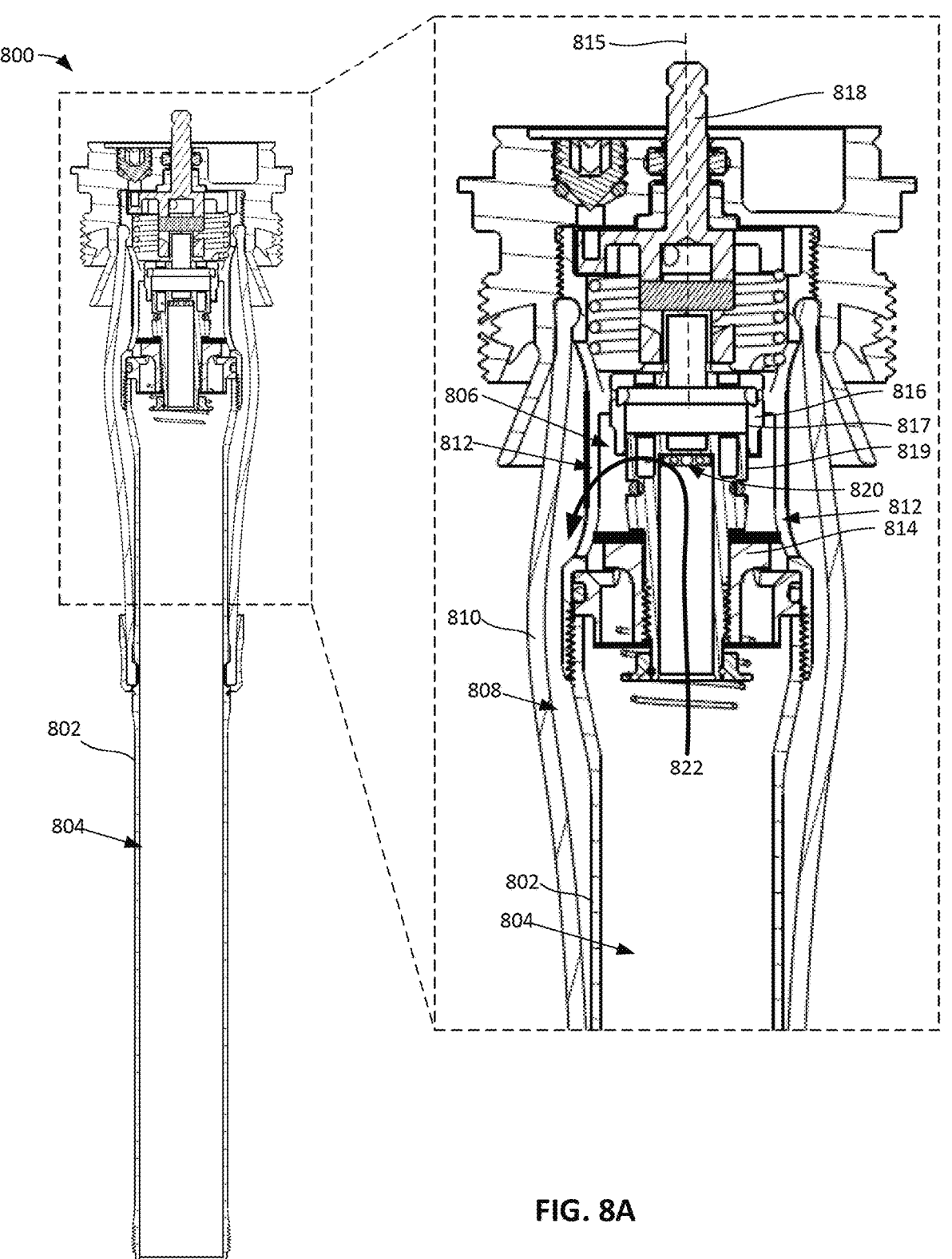
FIG. 8A is a cross-section of an example damper having an example damper member that may be utilized in the example fork of FIG. 7.

FIG. 8A is a cross-sectional view of an example damper 800 that can be implemented as the damper 720 in the fork 700 of FIG. 7. The damper 800 can include a damper body having one or more bodies that define first and second chambers. In the illustrated example, the example damper 800 includes a first damper body 802 and a second damper body 810 (which may be implemented as a bladder) that is disposed around a portion of the first damper body 802. In the illustrated example, the first damper body 802 defines a first chamber 804. The first chamber 804 is to be filled with a damping fluid. When the damper 800 is assembled in the fork 700, the piston 728 (FIG. 7) is slidably disposed in the first chamber 804 in the first damper body 802.

An enlarged view of the callout is shown in FIG. 8A. In the illustrated example, the damper 800 includes an example damper member 806. The damper member 806 controls fluid flow between the first chamber 804 and a second chamber 808 in the damper body (e.g., the first and second damper bodies 802, 810). In this example, the second chamber 808 (which may be referred to as a compensator) is defined between an outside of the first damper body 802 and an inside of the second damper body 810. In some examples, the second damper body 810 is implemented as a bladder. In some examples, the bladder is flexible. In other examples, the second chamber 808 may be disposed in another location. One or more openings 812 (two of which are referenced in FIG. 8A) are formed in an upper portion of the first damper body 802 to enable fluid flow between the first and second chambers 804, 808.

In this example, the damper member 806 utilizes a two-position spool valve to control the flow of fluid between the first and second chambers 804, 808 during a compression stroke. The damper member 806 includes a damper member body 814, referred to herein as the body 814. In this example, the body 814 is fixedly coupled to the first damper body 802 (e.g., via a clamping interface, via threaded engagement, etc.). The body 814 may be constructed of a single unitary part or multiple parts that are coupled together. The body 814 is disposed below the openings 812 in FIG. 8A. To control the flow of fluid across the body 814 from the first chamber 804 to the second chamber 808 during a compression stroke, the damper member 806 includes a flow member 816. The body 814 and the flow member 816 form a spool valve. The flow member 816 is movable (e.g., slidable) up and down in the orientation of FIG. 8A relative to the body 814. In particular, the flow member 816 is movable relative to the body 814 along an axis 815, referred to herein as the axis of movement 815. In this example, the axis of movement 815 is the same as or coincident with the longitudinal axis of the damper 800, as well the central axis of the damper member 806.

In this example, the flow member 816 is disposed outside of the body 814. In this example the flow member 816 is cup-shaped, and the flow member 816 is moveable (e.g., slidable) along an outer surface 819 of the body 814. In some examples, an inner surface 817 of the flow member 816 is slidably engaged (e.g., in contact) with the outer surface 819 of the body 814. In other examples, a small gap may exist between the inner surface 817 and the outer surface 819.

In the illustrated example, the damper 800 includes an actuator 818 to move the flow member 816. In this example, the actuator 818 is implemented as a barrel cam, which converts rotary motion of the actuator 818 to linear motion of the flow member 816. As the actuator 818 is rotated, the flow member 816 is moved up or down relative to the body 814. The barrel cam provides precise control over the position of the flow member 816 between the different positions or states. The actuator 818 may be rotated manually by a user (e.g., via a compression adjustment dial) and/or via an actuation mechanism, such as a motor or solenoid. The actuator 818 is disclosed in further detail in connection with FIGS. 9 and 10. In other examples, other types of actuators may be used.

As shown in FIG. 8A, the body 814 has a set of radial openings 820 (one of which is referenced in FIG. 8A) spaced around the first body 814. In this example, the radial openings 820 are distributed circumferentially around the body 814. The radial openings 820 enable fluid flow between an inner passage of the body 814 (which is in fluid communication with a lower portion of the first chamber 804) and the upper portion of the first chamber 804 adjacent the openings 812. Any number of radial openings may be provided (e.g., one, two, three, etc.). In some examples, the radial openings 820 are spaced equidistant from one another. The radial openings 820 are aligned along axes that are transverse (e.g., perpendicular) to the axis of movement 815 along which the flow member 816 moves (e.g., up and down in FIG. 8A). Therefore, the radial openings 820 define flow paths that are transverse to the axis of movement 815. In some examples, the radial openings 820 are aligned along axes that are radial (perpendicular) to the axis of movement 815. In the illustrated example, the radial openings 820 are circular shaped. In other examples, the radial openings 820 can be shaped differently (e.g., square, triangular, polygonal, etc.).

Figure 8B:
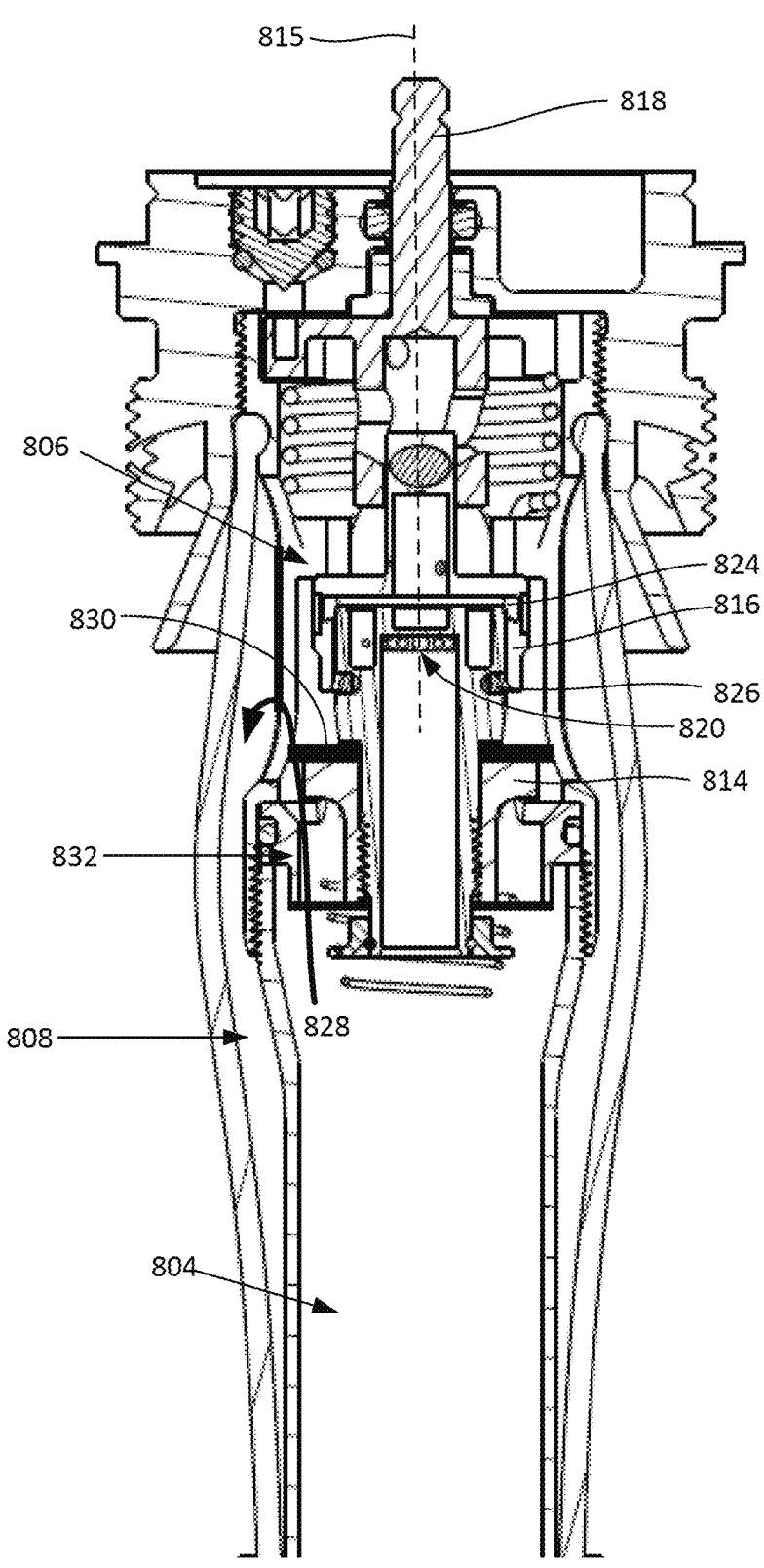
FIG. 8B illustrates the example damper of FIG. 8A showing a second example compression flow path.

In this example, the flow member 816 is movable up and down between a first position, referred to herein as an open position (which is the position shown in FIG. 8A), and a second position, referred to herein as a closed position (which is shown in FIG. 8B). In the open position shown in FIG. 8A, the flow member 816 does not block the radial openings 820. During a compression stroke, fluid flows along a first compression flow path 822. In particular, fluid from the first chamber 804 flows through the inner passage of the body 814, through the radial openings 820 and into the upper portion of the first chamber 804, and through the openings 812 and into the second chamber 808. Therefore, when the flow member 816 is in the first position (the open position), the flow paths through the radial openings 820 form a portion of the first compression flow path 822 between the first and second chambers 804, 808. This flow of fluid dampens or slows the movement of the fluid, thereby dampening movement of the fork 700 (FIG. 7) during compression.

FIG. 8B shows the flow member 816 after being moved downward along the axis of movement 317 to the closed position. This position may also be referred to as a lockout position. In particular, similar to the damper member 300 of FIGS. 3A and 3B, the damper member 806 is operable in a lockout mode that provides relatively high damping to substantially limit movement (e.g., compression) of the fork 700 (FIG. 7).

The flow member 816 is moved to the closed position by moving (e.g., rotating) the actuator 818 (e.g., manually or via a motor) downward in FIG. 8B, which moves the flow member 816 downward in FIG. 8B. In the closed position, the flow member 816 blocks or closes the radial openings 820 (one of which is referenced in FIG. 8B) in the body 814. As such, during compression, fluid cannot flow along the first compression flow path 822 (FIG. 8A). This substantially locks or prevents the fork 700 (FIG. 7) from compressing. In the locked position, first and second seals 824, 826 (e.g., o-rings) provide a sealing interface between the body 814 and the flow member 816 to prevent leakage between the body 814 and the flow member 816.

However, in some examples, even in the lockout mode, the damper member 806 may still allow some movement under relatively high forces, such as where a rider comes down off of a jump and lands hard on the ground. This enables a blow off of some of the pressure in the first chamber 804. FIG. 8B illustrates a second compression flow path 828, which may be referred to as a lockout flow path. In the illustrated example, the damper member 806 includes a lockout shim 830 that covers a passageway 832 formed in the body 814. If the pressure of the fluid in the first chamber 804 reaches a threshold pressure, the fluid forces the lockout shim 830 to bend open. The fluid flows across the body 814 from the first chamber 804 to the second chamber 808 along the second compression flow path 828. Therefore, the flow member 816 is movable between a first position (the open position shown in FIG. 8A) in which the radial openings 820 are unblocked and a second position (the closed position shown in FIG. 8B) in which the radial openings 820 are blocked (via the flow member 816).

To move the flow member 816 back to the open position (FIG. 8A), the actuator 818 can be moved (e.g., rotated) in the opposite direction, which moves the flow member 816 upward, thereby unblocking the radial openings 820. Because the radial openings 820 form flow paths that are transverse to the movement of the flow member 816, the pressure differential between the pressure in the lower portion of the first chamber 804 and the pressure in the second chamber 808 does not create a net load on the flow member 816. While the pressure differential may create a hoop stress on the flow member 816, this stress does not create a load against the movement of the flow member 816 (e.g., transverse to the axis of movement 815). As such, only a relatively small force is needed to move the flow member 816 between the opened and closed positions. This enables the use of a smaller, less powerful motor to move the flow member 316. The example damper 800 may also include the ability the change the damping rate during rebound.

Figure 9:
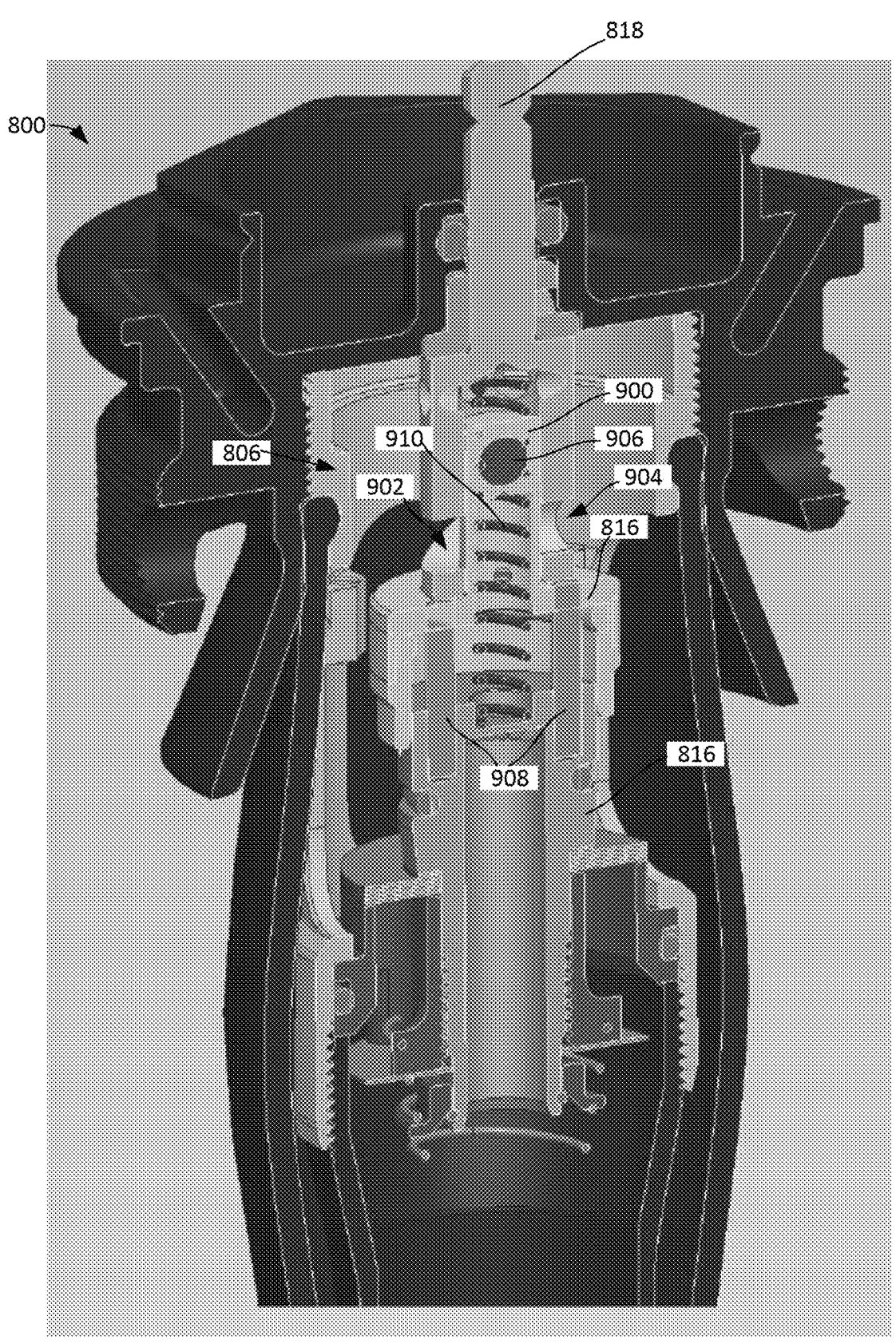
FIG. 9 is a perspective cross-sectioned view of an upper portion of the example damper of FIGS. 8A and 8B.

FIG. 9 is a perspective cross-sectioned view of the upper portion of the example damper 800. In the illustrated example, the flow member 816 includes a stem 900 that extends into the actuator 818. In the illustrated example, the actuator 818 has helical slots 902, 904. In this example, the damper member 806 includes a rod 906 coupled to the stem 900 and extending outward into the helical slots 902, 904. The flow member 816 is prevented from rotating by one or more guides 908 that are coupled to the flow member 816 and that extend into corresponding slots in the body 814. As the actuator 818 is rotated, the rod 906 is forced to move up or down via interaction of the rod 906 and the helical slots 902, 904, which moves the flow member 816 linearly up or down along the axis of movement 815 (FIGS. 8A and 8B). As such, the actuator 818 operates as a cam to convert rotary motion into linear motion. Different slot profiles can be utilized to achieve different motions. In the illustrated example, the damper 800 includes a biasing member, such as spring 910, to bias the flow member 816 upward to the open position.

Figure 10:
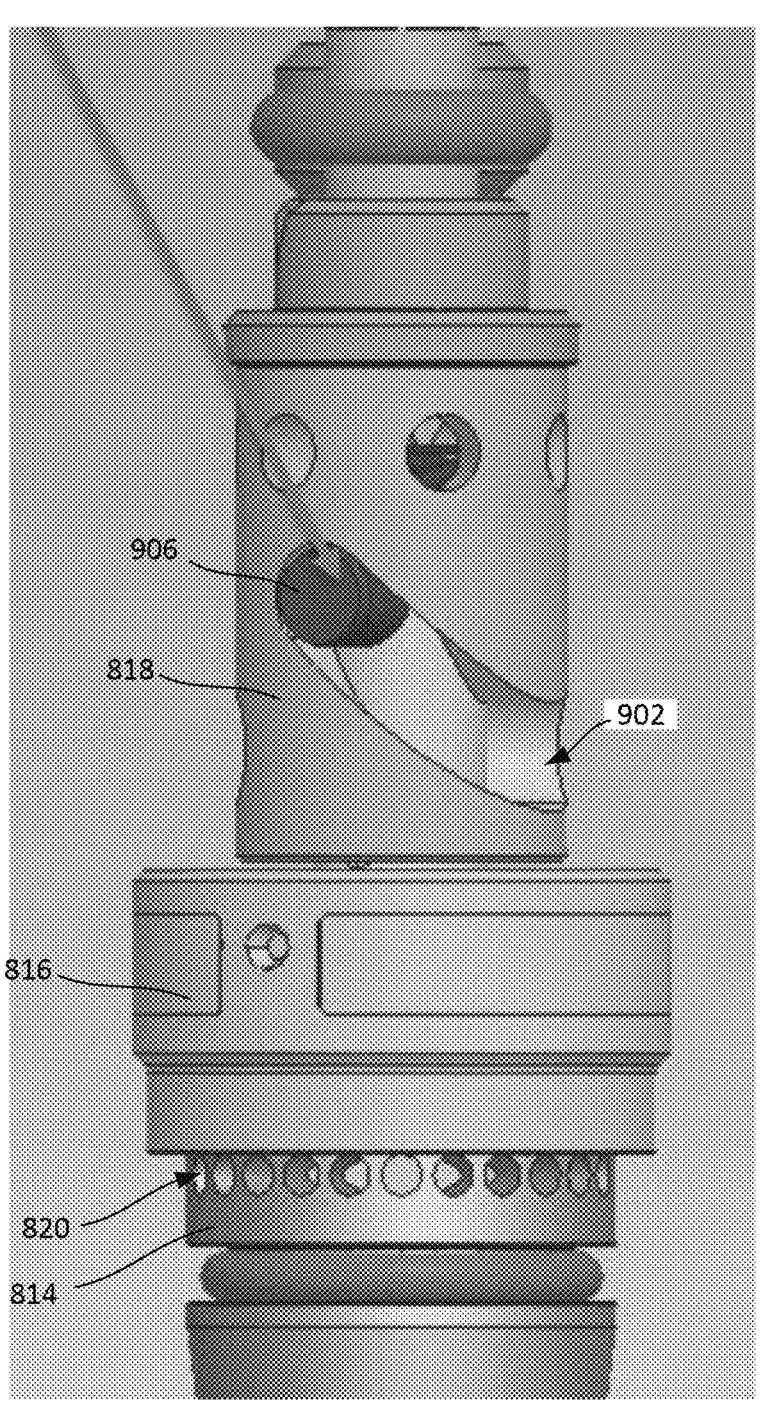
FIG. 10 is a perspective view of an example body, an example flow member, and an example actuator of the example damper member of FIGS. 8A and 8B.

FIG. 10 is a perspective assembled view of the body 814, the flow member 816, and the actuator 818. In FIG. 10, the flow member 816 is in the open position. As such, the radial openings 820 (one of which is referenced in FIG. 10) are unblocked. Also shown in FIG. 10 is the rod 906 disposed in one of the helical slots 902.

Figure 11A:
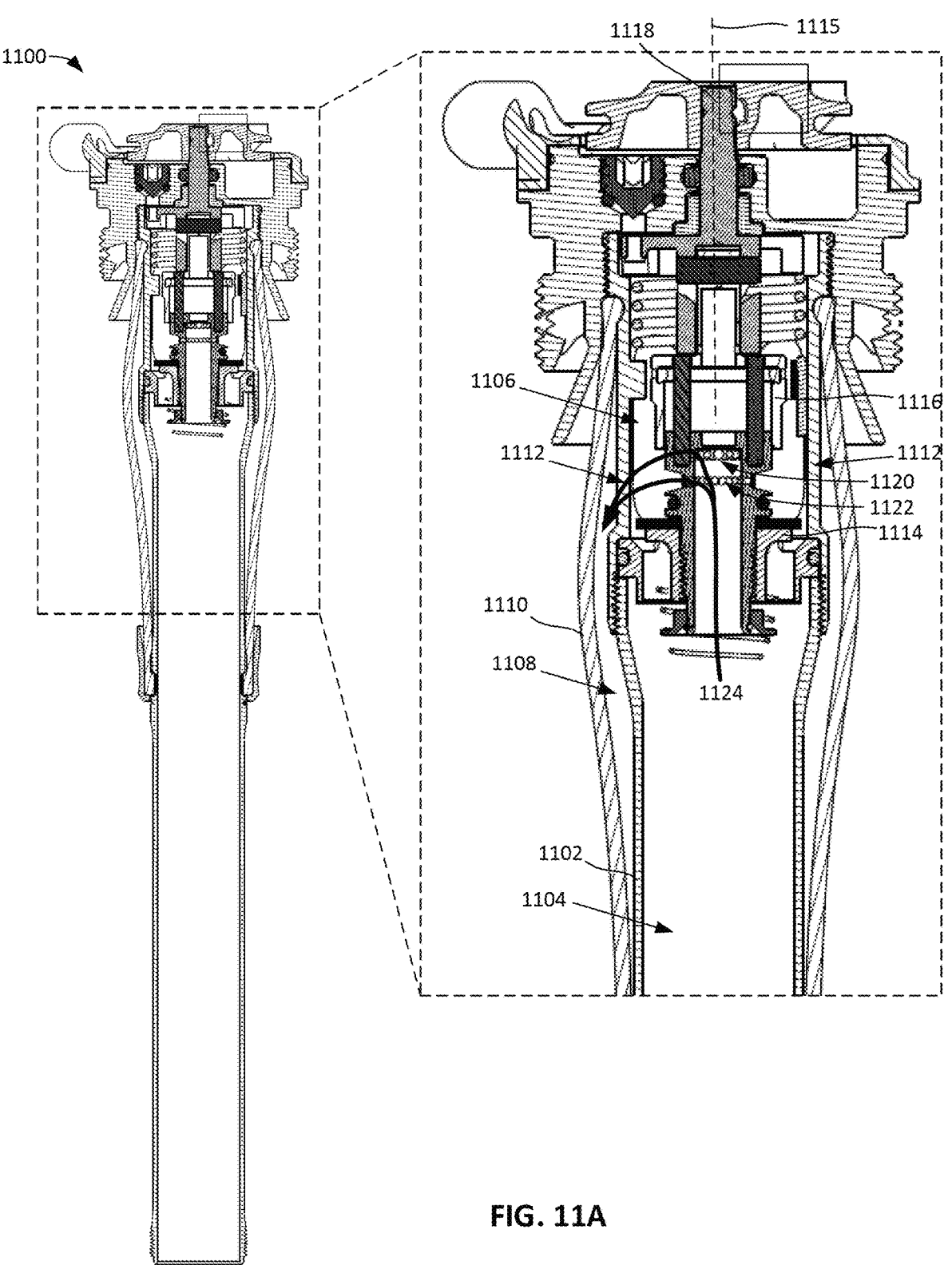
FIG. 11A is a cross-sectional view of another example damper having an example damper member that may be utilized in the example fork of FIG. 7.

FIG. 11A is a cross-sectional view of another example damper 1100 that can be implemented as the damper 720 in the fork 700 of FIG. 7. An enlarged view of the callout is shown in FIG. 11A. The damper 1100 is similar to the damper 800 of FIG. 8 and includes a damper body 1102, a first chamber 1104, a damper member 1106, a second chamber 1108, a bladder 1110, one or more openings 1112 (two of which are referenced in FIG. 11A) formed in an upper portion of the damper body 1102, a damper member body 1114 (referred to herein as the body 1114), a flow member 1116, an axis of movement 1115 along which the flow member 1116 moves relative to the body 1114, and an actuator 1118. To avoid redundancy, a description of these component is not provided. The actuator 1118 is substantially the same as the actuator 818 (FIGS. 8A, 8B, 9, and 10) and can be used to similarly move the flow member 1116 up and down relative to the body 1114.

In this example, the damper member 1106 utilizes a three-position spool valve to control the flow of fluid between the first and second chambers 1104, 1108. As shown in FIG. 11A, the body 1114 includes a first set of radial openings 1120 and a second set of radial openings 1122. The first and second set of radial openings 1120, 1122 enable fluid flow between an inner passage of the body 1114 (which is in fluid communication with a lower portion of the first chamber 1104) and the upper portion of the first chamber 1104 adjacent the openings 1112. In this example, the first set of radial openings 1120 are distributed circumferentially around the body 1114, and the second set of radial openings 1122 are distributed circumferentially around the body 1114. Any number of radial openings may be provided (e.g., one, two, three, etc.). In the illustrated example, the first set of radial openings 1120 and the second set of radial openings 1122 are axially spaced apart. In some examples, the radial openings 1120, 1122 are spaced equidistant from one another. The radial openings 1120, 1122 are aligned along axes that are transverse (e.g., perpendicular) to the axis of movement 1115 along which the flow member 1116 moves (e.g., up and down in FIG. 11A). Therefore, the radial openings 1120, 1122 define flow paths that are transverse to the axis of movement 1115. In some examples, the radial openings 1120, 1122 are aligned along axes that are radial (perpendicular) to the axis of movement 1115. In the illustrated example, the radial openings 1120, 1122 are circular shaped. In other examples, the radial openings 1120, 1122 can be shaped differently (e.g., square, triangular, polygonal, etc.).

Figure 11B:
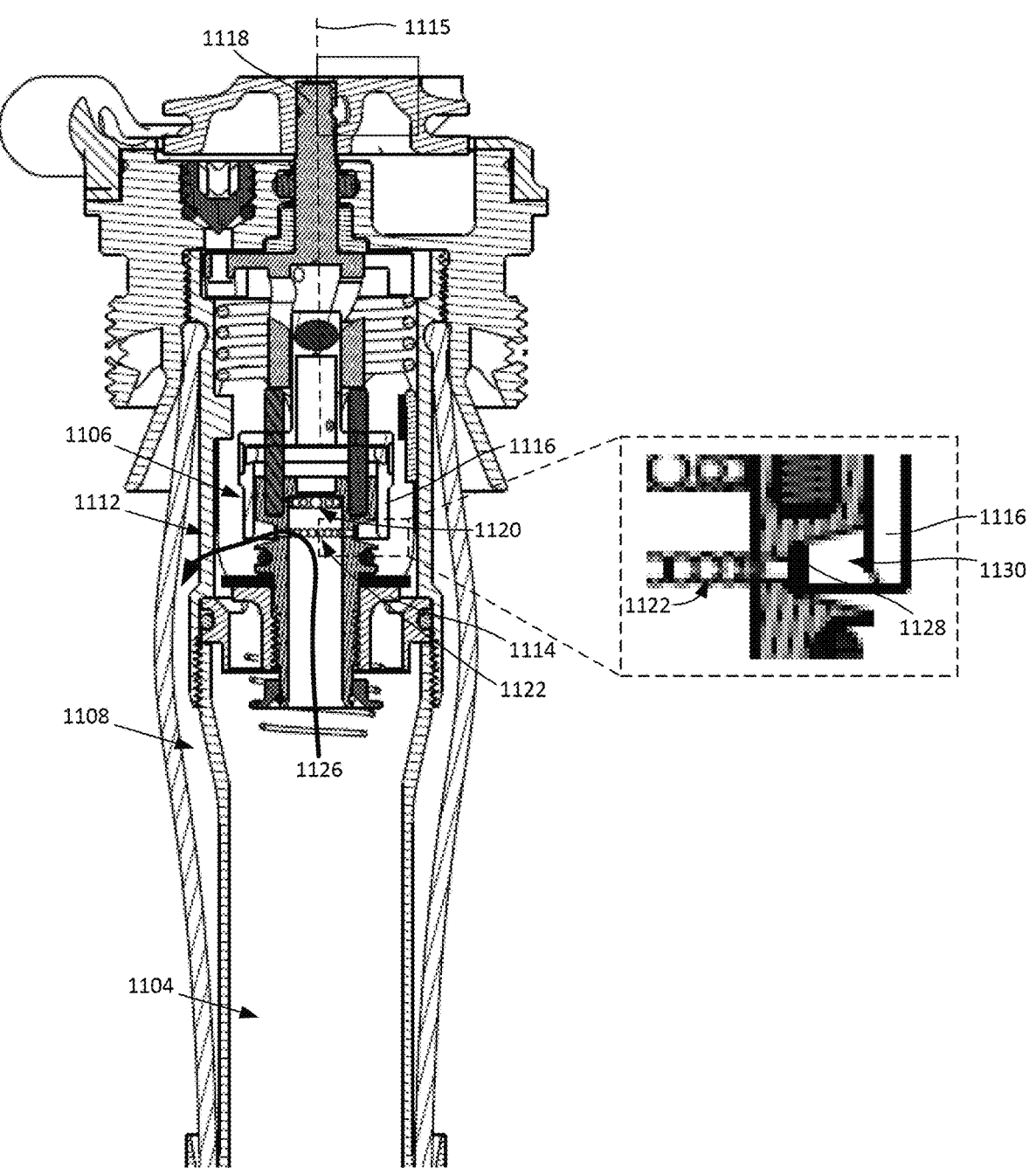
FIG. 11B illustrates the example damper of FIG. 11A showing a second example compression flow path.
Figure 11C:
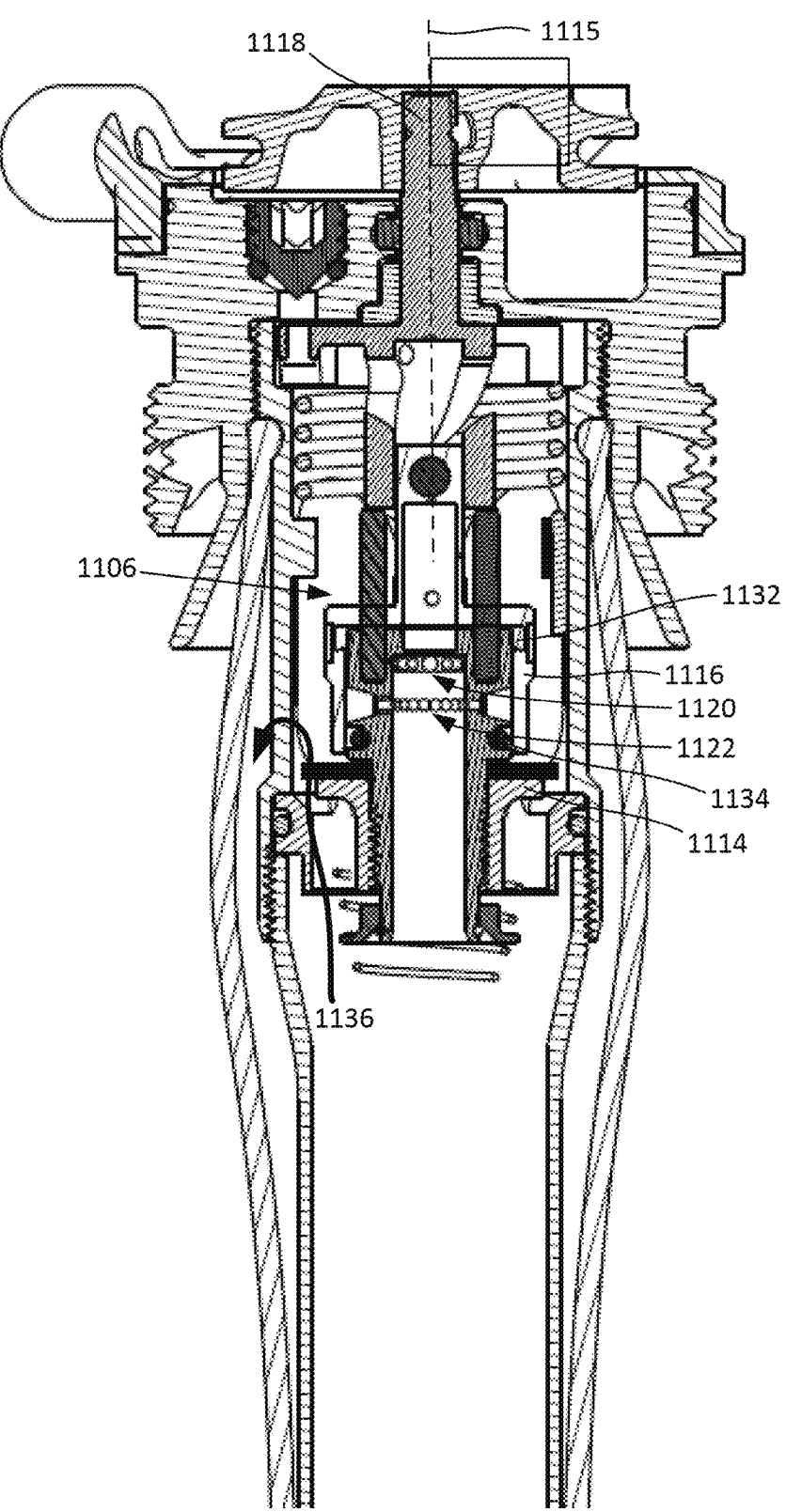
FIG. 11C illustrates the example damper of FIGS. 11A and 11B showing a third example compression flow path.

In this example, the flow member 1116 is movable up and down between a first position, referred to herein as an open position (which is the position shown in FIG. 11A), a second position, referred to herein as a partially open position (which is shown in FIG. 11B), and a third position, referred to herein as a closed position (which is shown in FIG. 11C). In the open position shown in FIG. 11A, the flow member 1116 does not block the first or second sets of radial openings 1120, 1122. Therefore, when the flow member 1116 is in the open position, the first of radial openings 1120 and the second set of radial openings 1122 are unblocked. During a compression stroke, fluid flows along a first compression flow path 1124 illustrated in FIG. 11A. In particular, fluid from the first chamber 1104 flows through the inner passage of the body 1114, through the first and second sets of radial openings 1120, 1122 and into the upper portion of the first chamber 1104, and through the openings 1112 and into the second chamber 1108. Therefore, when the flow member 1116 is in the first position (the open position), the flow paths through the radial openings 1120, 1122 form a portion of the first compression flow path 1124 between the first and second chambers 1104, 1108. This flow of fluid dampens or slows the movement of the fluid, thereby dampening movement of the fork 700 (FIG. 7) during compression.

FIG. 11B shows the flow member 1116 after being moved downward along the axis of movement 1115 to the partially open position. The partially open position is between the open position (FIG. 11A) and the closed position (FIG. 11C). The flow member 1116 is moved to the partially open position by moving (e.g., rotating) the actuator 1118 (e.g., manually or via a motor), which moves the flow member 1116 downward in FIG. 11B. When the flow member 1116 is in the partially open position, the flow member 1116 blocks the first set of radial openings 1120. As such, fluid cannot flow through the first set of radial openings 1120. However, in the partially open position shown in FIG. 11B, the flow member 1116 does not block the second set of radial openings 1122. Thus, the second set of radial openings 1122 are still open or unblocked. FIG. 11B illustrates a second compression flow path 1126 along which fluid flows during a compression stroke when the flow member 1116 is in the partially open position. As shown, during a compression stroke, fluid from the first chamber 1104 flows through the inner passage of the body 1114, through the second set of radial openings 1122 and into the upper portion of the first chamber 1104, and through the openings 1112 and into the second chamber 1108. Because fewer channels are provided for the fluid, the second compression flow path 1126 creates higher resistance than the first compression flow path 1124 (FIG. 11A). This reduces the compression rate of the fork 700 (FIG. 7), which may be desirable based on rider style and terrain.

In some examples, to create additional resistance, the example damper member 1106 may include a resistor around the second set of radial openings 1122. An enlarged view of the second set of radial openings 1122 is shown in the callout. As shown in the callout, a resistor 1128 is disposed around the body 1114 and around the second set of radial openings 1122. In some examples, the resistor is radially expandable to slow the flow of fluid through the second set of radial openings 1122. For example, the resistor 1128 may be implemented as a radially flexible shim or spring. The fluid flowing through the second set of radial openings 1122 causes the resistor 1128 to expand, so that the fluid can flow around the resistor 1128. This expansion causes resistance on the flowing fluid, which helps slow the movement of fluid through the second set of radial openings 1122. Differently designed resistors can be implemented to increase or decrease the resistance. In this manner, resistance in the partially open position can be independently tuned without the need for additional pistons. The resistor 1128 may be a continuous piece of material, or have ends that overlap, for example. The resistor 1128 may be constructed of rubber or metal, for example.

As shown in the callout, when the flow member 1116 is in the partially open position, the flow member 1116 is disposed around the resistor 1128. This helps prevent the resistor 1128 from over-expanding and/or becoming dislodged. Further, as shown in the callout, the resistor 1128 is disposed in a v-shaped groove 1130 formed in the body 1114. The v-shaped groove 1130 helps align the resistor 1128 with the second set of radial openings 1122. In other examples, the resistor 1128 may not be included in the example damper member 1106.

FIG. 11C shows the flow member 1116 after being moved downward along the axis of movement 417 to the closed position. This position may also be referred to as a lockout position. Similar to the flow member 816 of FIGS. 8A and 8B, the flow member 1116 is operable in a lockout mode that provides relatively high damping to substantially limit movement of the fork 700 (FIG. 7).

The flow member 1116 is moved to the closed position by moving (e.g., rotating) the actuator 1118 (e.g., manually or via a motor), which moves the flow member 1116 downward in FIG. 11C. In the closed position, the flow member 1116 blocks the first set of radial openings 1120 and the second set of radial openings 1122 (one of each is referenced in FIG. 11C) in the body 1114. As such, during compression, fluid cannot flow along the first compression flow path 1124 (FIG. 11A) or the second compression flow path 1126 (FIG. 11B). This substantially locks or prevents the fork 700 (FIG. 7) from compressing. In the locked position, first and second seals 1132, 1134 (e.g., o-rings) provide a sealing interface between the body 1114 and the flow member 1116 to prevent leakage between the body 1114 and the flow member 1116.

FIG. 11C illustrates a third compression flow path 1136, which may be referred to as a lockout flow path. The third compression flow path 1136 is the same as the second compression flow path 828 of FIG. 8B. Thus, to avoid redundancy, a description of the third compression flow path 1136 is not repeated herein. Therefore, the flow member 1116 is movable between a first position (the open position shown in FIG. 11B) in which the radial openings 1120, 1122 are unblocked, a second position (the partially open position shown in FIG. 11B) in the first set of radial openings 1120 are blocked (via the flow member 1116) and the second set of radial openings 1122 are unblocked, and a third position (the closed position shown in FIG. 11C) in which the first and second sets of radial openings 1120, 1122 are blocked (via the flow member 1116).

To move the flow member 1116 back to the open position (FIG. 11A) or the partially open position (FIG. 11B), the actuator 1118 can be moved (e.g., rotated) in the opposite direction, which moves the flow member 1116 upward, thereby unblocking the first and/or second sets of radial openings 1120, 1122. Because the first and second sets of radial openings 1120, 1122 are transverse to the movement of the flow member 1116 (e.g., transverse to the axis of movement 1115), the pressure differential between the pressure in the lower portion of the first chamber 1104 and the pressure in the second chamber 1108 does not create a net load on the flow member 1116. While the pressure differential may create a hoop stress on the flow member 1116, this stress does not create a load against the movement of the flow member 1116. As such, only a relatively small force is needed to move the flow member 1116 between the opened and closed positions. This enables the use of a smaller, less powerful motor to move the flow member 1116. The example damper 1100 may also include the ability the change the damping rate during rebound.

While the example damper members 300 and 400 described in connection with the shock absorber 200 have flow members that are inside of the body of the damper member, and the example damper members 806 and 1106 described in connection with the shock absorber 702 have flow members that are outside of the body of the damper member, any of the example damper member configurations disclosed herein be implemented in connection with any of the example shock absorbers. For example, the example damper member 300 or the example damper member 400 can be implemented as the damper member 730 in the fork 700, such that the flow member is disposed inside of the body of the damper member. For example, the first and second bodies 304, 306 of the example damper member 300 can be fixedly coupled to the first damper body 802 in place of the body 814. In such an example, the flow member 316 can move between one or more positions within the first body 304 to control the flow of fluid between the first and second chambers 804, 808. Similarly, the example damper member 806 or the damper member 1106 can be implemented as the damper member 226 in the shock absorber 200. For example, the body 814 of the example damper member 806 can be coupled to the shaft 218 of the shock absorber 200 in place of the first and second bodies 304, 306. In such an example, the flow member 816 can move between one or more positions outside of the body 814 to control the flow of fluid between the first and second chambers 228, 230.

Example systems, apparatus, and articles of manufacture for bicycles (and/or other vehicles) are disclosed herein. Further examples and combinations thereof include the following:

Example 1 is a damper for a suspension component of a bicycle. The damper includes a damper body and a damper member disposed in the damper body to control a flow of fluid between a first chamber and a second chamber in the damper body. The damper member includes a damper member body and a flow member movable relative to the damper member body along an axis of movement. The damper member body has a set of radial openings distributed circumferentially around the damper member body. The radial openings define flow paths that are transverse to the axis of movement. The flow member is movable between a first position in which the radial openings are unblocked and a second position in which the radial openings blocked.

Example 2 includes the damper of Example 1, wherein, when the flow member is in the first position, the flow paths form a portion of a compression flow path between the first and second chambers.

Example 3 includes the damper of Examples 1 or 2, wherein the radial openings are aligned along axes that are radial relative to the axis of movement.

Example 4 includes the damper of any of Examples 1-3, wherein the radial openings are spaced equidistant from one another.

Example 5 includes the damper of any of Examples 1-4, wherein the flow member is disposed in a cavity formed in the damper member body. The flow member is slidable along an inner surface of the damper member body between the first and second positions.

Example 6 includes the damper of any of Examples 1-5, wherein the flow member includes a passageway, and wherein the flow member is movable to a third position between the first position and the second position in which the passageway is aligned with the radial openings.

Example 7 includes the damper of Example 6, wherein, when the flow member is in the first position, a first compression flow path is formed through the damper member between the first and second chambers, and when the flow member is in the third position, a second compression flow path is formed through the damper member between the first and second chambers.

Example 8 includes the damper of any of Examples 1-4, wherein the flow member is slidable along an outer surface of the damper member body.

Example 9 includes the damper of Example 8, wherein the set of radial openings is a first set of radial openings. The damper member body includes a second set of radial openings distributed circumferentially around the damper member body. The first set of radial openings and the second set of radial openings are axially spaced apart.

Example 10 includes the damper of Example 9, wherein, when the flow member is in the first position, the first set of radial openings and the second set of radial openings are unblocked, and when flow member is in the second position, the first set of radial openings and the second set of radial openings are blocked.

Example 11 includes the damper of Example 10, wherein the flow member is movable to a third position between the first and second positions in which the first of radial openings are blocked and the second set of radial openings are unblocked.

Example 12 includes the damper of any of Examples 9-11, wherein the damper member includes a resistor disposed around the damper member body and around the second set of radial openings. The resistor is radially expandable to slow the flow of fluid through the second set of radial openings.

Example 13 includes the damper of any of Examples 1-12, wherein the damper is integrated into a shock absorber.

Example 14 includes the damper of any of Examples 1-13, wherein the damper is integrated into a fork of the bicycle.

Example 15 is a damper for a suspension component of a bicycle. The damper includes a damper body and a damper member disposed in the damper body to control a flow of fluid between a first chamber and a second chamber in the damper body. The damper member includes a damper member body having a cavity. The damper member body has a set of radial openings distributed circumferentially around the damper member body. The radial openings to enable fluid flow between the second chamber and the cavity. The damper member also includes a flow member disposed in the cavity of the damper member body. The flow member is movable relative to the damper member body along an axis of movement. The radial openings are aligned along axes that are radial relative to the axis of movement. The flow member is movable between a first position in which the radial openings are unblocked and a second position in which the radial openings are unblocked.

Example 16 includes the damper of Example 15, wherein an outer surface of the flow member is slidably engaged with an inner surface of the damper member body defining the cavity.

Example 17 includes the damper of Examples 15 or 16, wherein the damper member is movable in the damper body.

Example 18 is a damper for a suspension component of a bicycle. The damper includes a damper body and a damper member disposed in the damper body to control a flow of fluid between a first chamber and a second chamber in the damper body. The damper member includes a damper member body having a set of radial openings distributed circumferentially around the damper member body and a flow member disposed outside of the damper member body. The flow member is movable relative to the damper member body along an axis of movement. The radial openings are aligned along axes that are radial relative to the axis of movement. The flow member is movable between a first position in which the radial openings are unblocked and a second position in which the radial openings are blocked.

Example 19 includes the damper of Example 18, wherein an inner surface of the flow member is slidably engaged with an outer surface of the damper member body.

Example 20 includes the damper of Examples 18 or 19, wherein body of the damper member is fixedly coupled to the damper body.

Example 21 is a device including any feature described, either individually or in combination with any feature, in any configuration.

Example 22 is a damper to dampen movement of a suspension component of a bicycle.

Example 23 includes the damper of Example 22, further including a damper body and a damper member disposed in the damper body to control fluid flow between a first chamber and a second chamber.

Example 24 includes the damper of Example 23, wherein the damper member includes a body including a plurality of radial openings and a flow member movable relative to the body between a first position in which the radial openings are unblocked and a second position in which the flow member blocks the radial openings.

Example 25 includes the damper of Example 24, wherein the radial openings define flow paths that are transverse to a direction of movement of the flow member.

Example 26 includes the damper of Examples 24 or 25, wherein the flow member is disposed inside a cavity defined in the body.

Example 27 includes the damper of Examples 24 or 25, wherein the flow member is disposed outside of the body.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, are apparent to those of skill in the art upon reviewing the description.

The Abstract of the Disclosure is provided to comply with 37 C.F.R. § 1.72 (b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

What is claimed is:

1. A damper for a suspension component of a bicycle, the damper comprising:
   a damper body;
   a damper member disposed in the damper body to control a flow of fluid between a first chamber and a second chamber in the damper body, the damper member including:
      a damper member body, and
      a flow member slidable along a surface of the damper member body so as to be adjustable relative to the damper member body along an axis of movement, the damper member body having a set of radial openings distributed circumferentially around the damper member body, the radial openings defining flow paths that are transverse to the axis of movement, the flow member movable between a first position in which the radial openings are unblocked and a second position in which the radial openings are blocked;

a shaft extending along the axis of movement through at least one of the first chamber or the second chamber, the shaft coupled with the damper member; and an actuator rotatable to cause the flow member to slide along the surface of the damper member body between the first position and the second position.

2. The damper of claim 1, wherein, when the flow member is in the first position, the flow paths form a portion of a compression flow path between the first and second chambers.

3. The damper of claim 1, wherein the radial openings are aligned along axes that are radial relative to the axis of movement.

4. The damper of claim 1, wherein the radial openings are spaced equidistant from one another.

5. The damper of claim 1, wherein the flow member is disposed in a cavity formed in the damper member body, the flow member slidable along an inner surface of the damper member body between the first and second positions.

6. The damper of claim 5, wherein the flow member includes a passageway, and wherein the flow member is movable to a third position between the first position and the second position in which the passageway is aligned with the radial openings.

7. The damper of claim 6, wherein, when the flow member is in the first position, a first compression flow path is formed through the damper member between the first and second chambers, and when the flow member is in the third position, a second compression flow path is formed through the damper member between the first and second chambers.

8. The damper of claim 1, wherein the set of radial openings is a first set of radial openings, the damper member body including a second set of radial openings distributed circumferentially around the damper member body, the first set of radial openings and the second set of radial openings axially spaced apart.

9. The damper of claim 8, wherein, when the flow member is in the first position, the first set of radial openings and the second set of radial openings are unblocked, and when flow member is in the second position, the first set of radial openings and the second set of radial openings are blocked.

10. The damper of claim 9, wherein the flow member is movable to a third position between the first and second positions in which first set of radial openings are blocked and the second set of radial openings are unblocked.

11. The damper of claim 8, wherein the damper member includes a resistor disposed around the damper member body and around the second set of radial openings, the resistor being radially expandable to slow the flow of fluid through the second set of radial openings.

12. The damper of claim 1, wherein the damper is integrated into a shock absorber.

13. The damper of claim 1, wherein the damper is integrated into a fork of the bicycle.

14. The damper of claim 1, wherein the surface of the damper member body is an outer surface.

15. The damper of claim 1, wherein the damper member is slidably received in the damper body.

16. The damper of claim 1, wherein the actuator passes through the shaft.

17. A damper for a suspension component of a bicycle, the damper comprising:

a damper body; and a damper member disposed in the damper body to control a flow of fluid between a first chamber and a second chamber in the damper body, the damper member including:

a damper member body having a cavity, the damper member body having a set of radial openings distributed circumferentially around the damper member body, the radial openings to enable fluid flow between the second chamber and the cavity; and a flow member disposed in the cavity of the damper member body, the flow member adjustable relative to the damper member body along an axis of movement, the radial openings aligned along axes that are radial relative to the axis of movement, the flow member adjustable between a first position in which the radial openings are unblocked and a second position in which the radial openings are blocked, wherein an outer surface of the flow member is slidably engaged with an inner surface of the damper member body defining the cavity.

18. The damper of claim 17, wherein the damper member is movable in the damper body.

19. A damper for a suspension component of a bicycle, the damper comprising:

a damper body; and a piston disposed in the damper body to control a flow of fluid between a first chamber and a second chamber in the damper body, the piston including:

a damper member body having a set of radial openings distributed circumferentially around the damper member body; and a flow member disposed outside of the damper member body, the flow member adjustable relative to the damper member body along an axis of movement, the radial openings aligned along axes that are radial relative to the axis of movement, the flow member adjustable between a first position in which the radial openings are unblocked and a second position in which the radial openings are blocked, wherein an inner surface of the flow member is slidably engaged with an outer surface of the damper member body; and an actuator rotatable to cause adjustment of the flow member between the first position and the second position.

20. The damper of claim 19, wherein a body of the piston is fixedly coupled to the damper body.

* * * * *